United States Patent
Yamamoto et al.

(10) Patent No.: US 10,581,346 B2
(45) Date of Patent: Mar. 3, 2020

(54) MOTOR USING VIBRATOR, AND ELECTRONIC APPARATUS

(71) Applicant: CANON KABUSHIKI KAISHA, Tokyo (JP)

(72) Inventors: Yasufumi Yamamoto, Kawasaki (JP); Toshiyuki Uehara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 327 days.

(21) Appl. No.: 15/725,587

(22) Filed: Oct. 5, 2017

(65) Prior Publication Data

US 2018/0102716 A1 Apr. 12, 2018

(30) Foreign Application Priority Data

Oct. 12, 2016 (JP) .................................. 2016-200722

(51) Int. Cl.
*H02N 2/02* (2006.01)
*H02N 2/00* (2006.01)
*H02N 2/04* (2006.01)
*G02B 7/10* (2006.01)

(52) U.S. Cl.
CPC .............. *H02N 2/026* (2013.01); *G02B 7/10* (2013.01); *H02N 2/006* (2013.01); *H02N 2/0015* (2013.01); *H02N 2/04* (2013.01)

(58) Field of Classification Search
CPC ...... H02N 2/026; H02N 2/0015; H02N 2/006; H02N 2/04
USPC ........................................ 310/323.01–323.21
See application file for complete search history.

(56) References Cited

U.S. PATENT DOCUMENTS

| 5,191,688 | A | * | 3/1993 | Takizawa | ............... | H01L 41/083 |
| | | | | | | 29/25.35 |
| 7,432,635 | B2 | | 10/2008 | Kawai | | |
| 9,660,556 | B2 | | 5/2017 | Yamamoto | | |
| 9,827,593 | B2 | | 11/2017 | Yamamoto | | |

(Continued)

FOREIGN PATENT DOCUMENTS

| CN | 1677151 A | 10/2005 |
| CN | 102017387 A | 4/2011 |

(Continued)

OTHER PUBLICATIONS

Office Action issued in Chinese Appln. No. 201710942345.2 dated May 8, 2019. English translation provided.

*Primary Examiner* — Derek J Rosenau
(74) *Attorney, Agent, or Firm* — Rossi, Kimms & McDowell LLP

(57) ABSTRACT

A motor capable of holding a vibrator without increasing a dimension thereof in a traveling direction (driving direction) and without having looseness. The motor includes a vibrator and a holding unit that holds the vibrator, and moves the vibrator and a sliding member in frictional contact with the vibrator relative to each other by vibrating the vibrator. A pressurizing unit pressurizes the vibrator against the friction member, and holding springs generate a holding force for causing the holding unit to hold the vibrator. The holding unit is not disposed between the pressurizing unit and the vibrator. A holding direction of the holding force generated by the holding springs and a pressurizing direction of a pressurizing force generated by the pressurizing unit are substantially parallel to each other.

7 Claims, 14 Drawing Sheets

(56) References Cited

U.S. PATENT DOCUMENTS

| | | |
|---|---|---|
| 9,912,850 B2 | 3/2018 | Ito |
| 2011/0037347 A1 | 2/2011 | Takizawa et al. |
| 2015/0183001 A1 | 7/2015 | Yamamoto |

FOREIGN PATENT DOCUMENTS

| | | |
|---|---|---|
| CN | 104065298 A | 9/2014 |
| CN | 104753390 A | 7/2015 |
| JP | 2015126692 A | 7/2015 |
| JP | 2016063664 A | 4/2016 |

\* cited by examiner

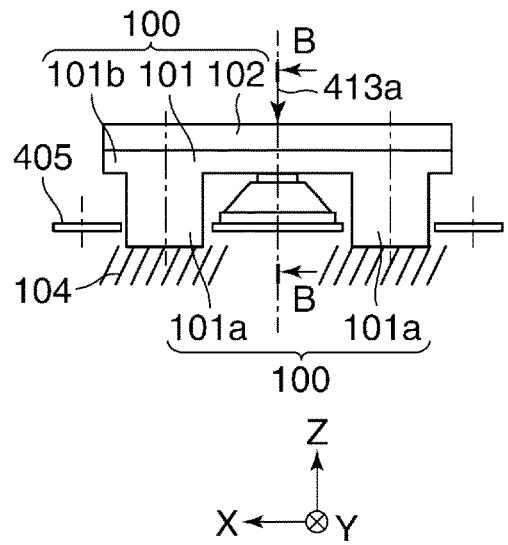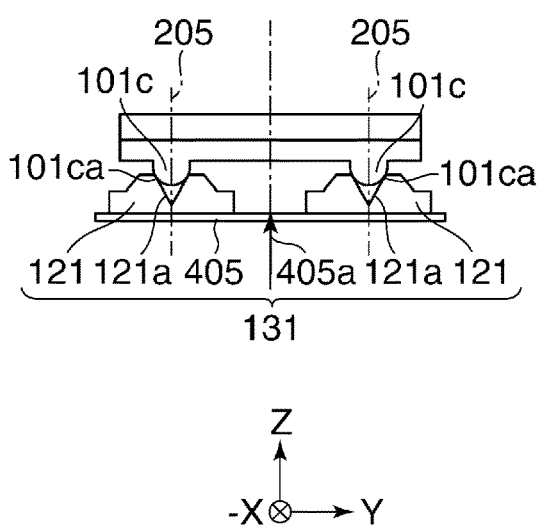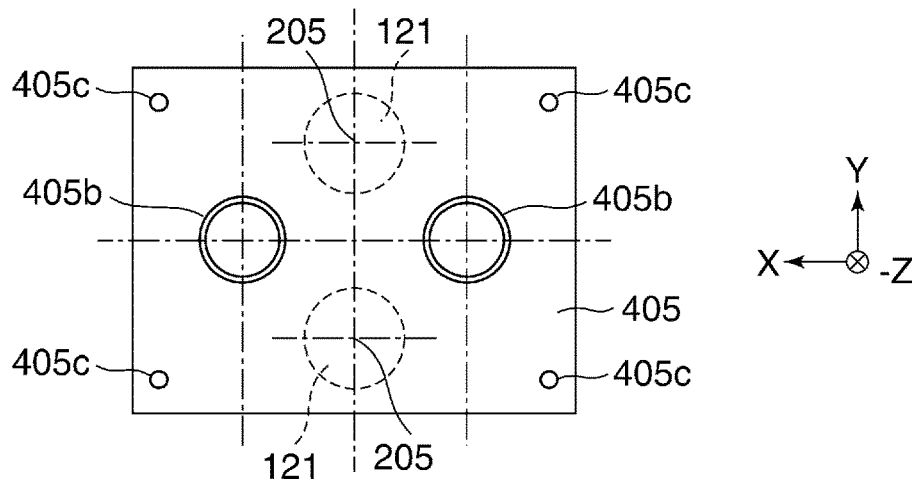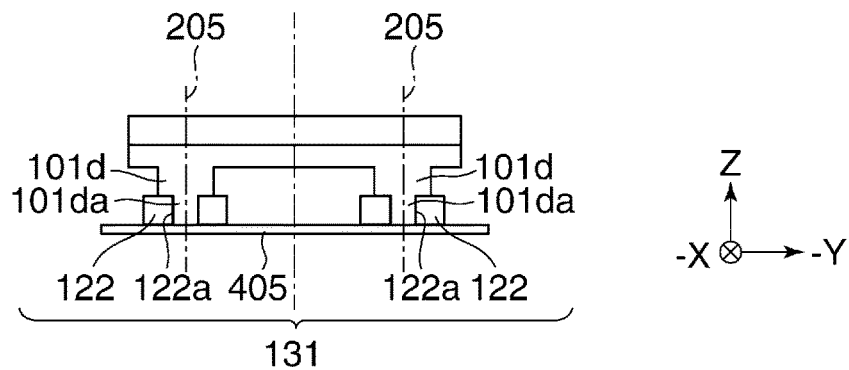

MOTOR USING VIBRATOR, AND ELECTRONIC APPARATUS

BACKGROUND OF THE INVENTION

Field of the Invention

The present invention relates to a motor using a vibrator, and an electronic apparatus using the motor.

Description of the Related Art

In general, in an ultrasonic motor, a vibrator which is periodically vibrated by applying a high-frequency voltage is brought into pressure contact with a sliding member to thereby move the sliding member and the vibrator relative to each other.

Examples of this ultrasonic motor include one that holds a vibrator in a state freely movable in a pressurizing direction with respect to a frame member, and also connects the vibrator without looseness in a traveling direction (see e.g. Japanese Laid-Open Patent Publication (Kokai) No. 2015-126692).

In Japanese Laid-Open Patent Publication (Kokai) No. 2015-126692, a base on which the vibrator is fixed is fixed to a holding member in such a manner that fixing portions extending from opposite ends of the base in the traveling direction are fixed to the holding member, and the holding member is connected to the frame member via rolling members and an urging member to thereby connect the vibrator to the frame member without looseness. With this arrangement, however, the ultrasonic motor is increased in the dimension in the traveling direction.

SUMMARY OF THE INVENTION

The present invention provides a motor that is capable of holding a vibrator without increasing a dimension thereof in a traveling direction (driving direction) and without having looseness, and an electronic apparatus.

In a first aspect of the present invention, there is provided a motor that includes a vibrator and a holding unit that holds the vibrator, and moves the vibrator and a friction member in frictional contact with the vibrator relative to each other, by vibrating the vibrator, comprising a pressurizing unit configured to pressurize the vibrator against the friction member, and a holding force generation unit configured to generate a holding force for causing the holding unit to hold the vibrator, wherein the holding unit is not disposed between the pressurizing unit and the vibrator, and wherein a holding direction in which the holding force is generated by the holding force generation unit and a pressurizing direction in which a pressurizing force is generated by the pressurizing unit are substantially parallel to each other.

In a second aspect of the present invention, there is provided an electronic apparatus including a motor that includes a vibrator and a holding unit that holds the vibrator, and moves the vibrator and a friction member in frictional contact with the vibrator relative to each other, by vibrating the vibrator, and a drive member that is driven by driving the motor, wherein the motor comprises a pressurizing unit configured to pressurize the vibrator against the friction member, and a holding force generation unit configured to generate a holding force for causing the holding unit to hold the vibrator, wherein the holding unit is not disposed between the pressurizing unit and the vibrator, and wherein a holding direction in which the holding force is generated by the holding force generation unit and a pressurizing direction in which a pressurizing force is generated by the pressurizing unit are substantially parallel to each other.

According to the present invention, the motor is capable of holding the vibrator without increasing the dimension in the traveling direction (driving direction) thereof and without having looseness.

Further features of the present invention will become apparent from the following description of exemplary embodiments (with reference to the attached drawings).

BRIEF DESCRIPTION OF THE DRAWINGS

FIGS. 9A to 9D are diagrams useful in explaining how a vibrator is held in the ultrasonic motor shown in FIGS. 8A and 8B.

FIGS. 15A to 15C are diagrams useful in explaining how a vibrator is held in an ultrasonic motor as a motor according to a sixth embodiment of the present invention.

DESCRIPTION OF THE EMBODIMENTS

The present invention will now be described in detail below with reference to the accompanying drawings showing embodiments thereof.

Figure 1A:
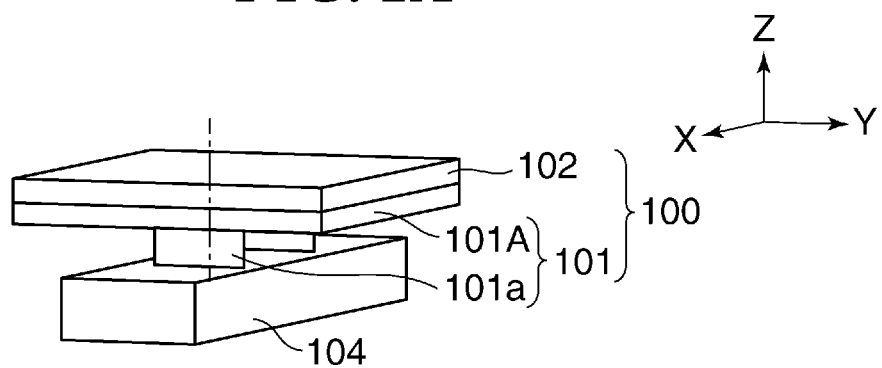
FIGS. 1A and 1B are diagrams useful in explaining the operating principles of a vibrator used as a drive source in the present invention.
Figure 1B:
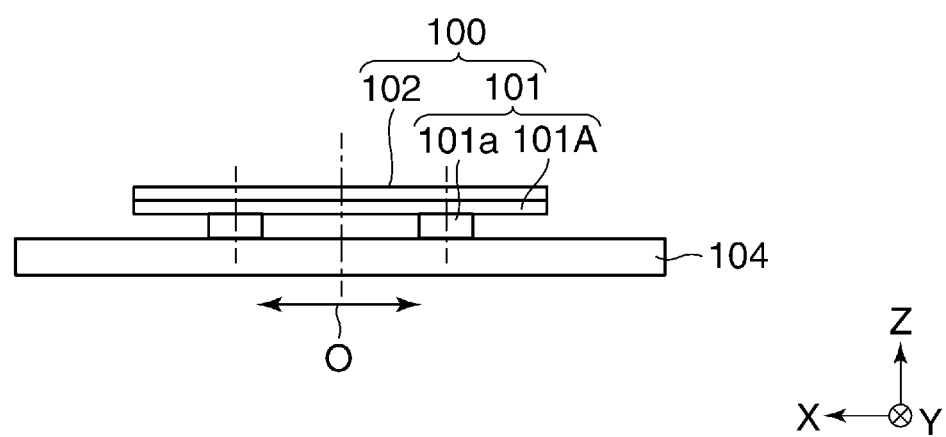

FIGS. 1A and 1B are diagrams useful in explaining the operating principles of a vibrator used as a drive source in the present invention. FIG. 1A is a perspective view showing the vibrator together with a sliding member, and FIG. 1B is a side view of FIG. 1A. Note that the vibrator having the illustrated construction is used in a third embodiment of the present invention, described hereinafter.

As shown in FIGS. 1A and 1B, the sliding member, denoted by reference numeral 104, as a driven member is brought into frictional contact with the vibrator, denoted by reference numeral 100. The vibrator 100 includes a piezoelectric element 102 and a vibration plate 101, and a high-frequency drive voltage is applied to the piezoelectric element 102. When a high-frequency drive voltage is applied to the piezoelectric element 102, ultrasonic vibrations (high-frequency vibrations) are generated on the vibration plate 101. The piezoelectric element 102 and the vibration plate 101 are joined to each other e.g. with an adhesive.

The vibration plate 101 has a rectangular portion 101A (flat surface) having a rectangular shape, which defines the surface joined to the piezoelectric element 102. Further, a surface (one surface) of the vibration plate 101, opposite to the joined surface, is formed with two protrusions (also referred to as the pressure-contact portions or the contact portions) 101a with a predetermined spacing therebetween. In the present example, two-phase high-frequency voltages are applied to the piezoelectric element 102 to thereby excite ultrasonic vibrations on the vibrator 100.

The vibrator 100 combines the two-phase ultrasonic vibrations, and is brought into pressure contact with the sliding member 104, whereby a driving force is generated in the vibrator 100 by a frictional force generated between the vibrator 100 and the sliding member 104. Then, the generated driving force is transmitted to the sliding member 104. In the illustrated example, the driving force moves the vibrator 100 relative to the sliding member 104 in an X direction (strictly, in the X direction or in a −X direction opposite to the X direction) indicated by a two-headed arrow O in FIG. 1B.

Figure 2A:
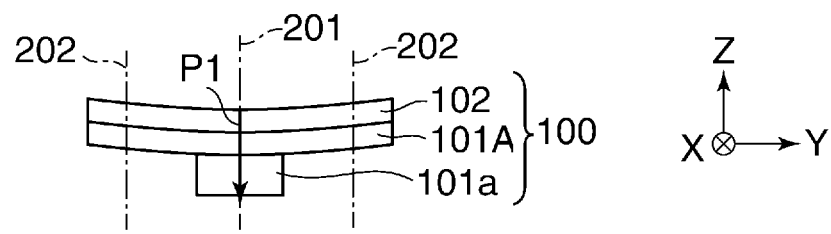
FIGS. 2A to 2D are diagrams useful in explaining vibration modes of the vibrator shown in FIGS. 1A and 1B.
Figure 2B:
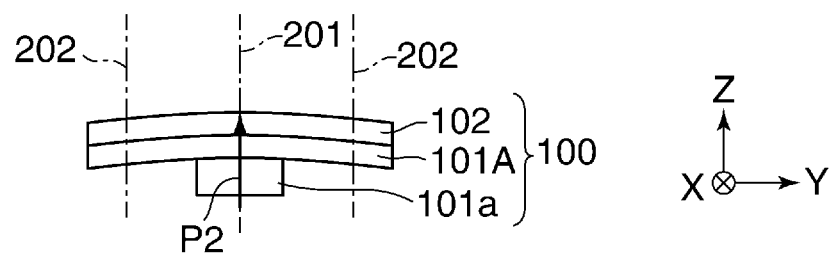
Figure 2C:
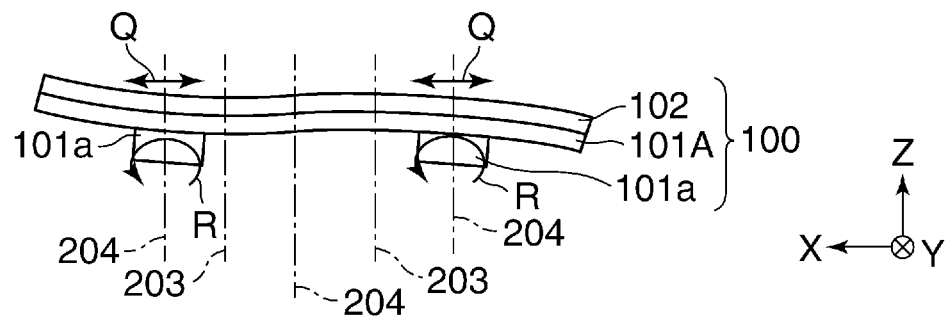
Figure 2D:
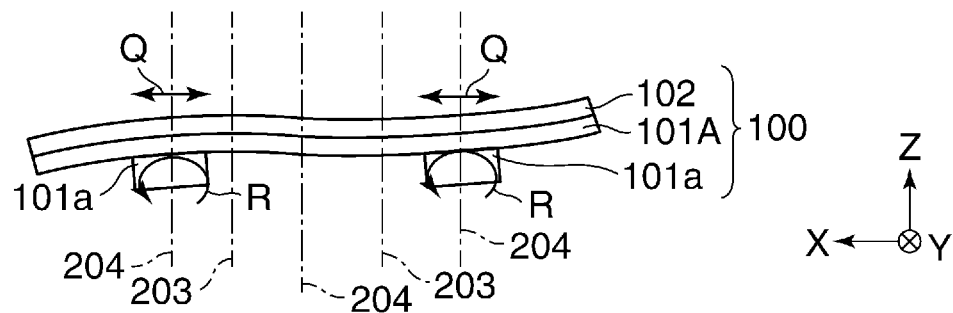

FIGS. 2A to 2D are diagrams useful in explaining vibration modes of the vibrator shown in FIGS. 1A and 1B. FIGS. 2A and 2B show a mode of a first bending vibration (first bending vibration mode), and FIGS. 2C and 2D show a mode of a second bending vibration (second bending vibration mode).

In an ultrasonic motor (vibration wave motor) using the vibrator, when a high-frequency drive voltage having a specific frequency is applied to the piezoelectric element 102, a plurality of desired vibration modes are excited. Then, by superposing these vibration modes, driving vibrations are generated.

In the illustrated example in FIGS. 1A and 1B, the two bending vibration modes are excited in the vibrator 100. FIGS. 2A and 2B show the first bending vibration mode which is a mode of bending vibration in a transverse direction of the vibrator 100. FIG. 2A shows a motion of the vibrator 100, as viewed from a longitudinal direction of the piezoelectric element 102 (X direction), which is caused when a positive voltage is simultaneously applied to two electrodes of the piezoelectric element 102 which are separate in the X direction as the longitudinal direction of the piezoelectric element 102, and FIG. 2B shows a motion of the vibrator 100, as viewed from the longitudinal direction (X direction), which is caused when a negative voltage is applied to the same.

FIGS. 2C and 2D show the second bending vibration mode which is a mode of bending vibration in a longitudinal direction of the vibrator 100. FIG. 2C shows a motion of the vibrator 100, as viewed from a transverse direction of the piezoelectric element 102 (Y direction), which is caused when the positive voltage is simultaneously applied to the two electrodes, and FIG. 2D shows a motion of the vibrator 100, as viewed from the transverse direction (Y direction), which is caused when the negative voltage is applied to the same. As shown in FIGS. 2A to 2D, the bending directions in the first and second bending vibration modes are orthogonal to each other.

The protrusions 101a are provided at respective locations each corresponding to or in the vicinity of an antinode 201 of the first bending vibration. The protrusions 101a repeat the motions shown in FIGS. 2A and 2B in accordance with the first bending vibration to thereby perform a vertical reciprocating motion indicated by arrows P1 and P2 in a Z direction. This reciprocating motion is a thrust component of driving motion. Note that reference numeral 202 denotes a node of the first bending vibration of the vibrator 100.

Further, the protrusions 101a are provided at respective locations each corresponding to or in the vicinity of a node 204 of the second bending vibration. The protrusions 101a perform pendulum motions pivoted about the mentioned locations by repeating the motions shown in FIGS. 2C and 2D in accordance with the second bending vibration, to thereby perform a reciprocating motion indicated by a two-headed arrow Q in the X direction. This reciprocating motion is a feed component of driving motion. Note that reference numeral 203 denotes an antinode of the second bending vibration of the vibrator 100.

Here, it is assumed that a direction in which the vibrator 100 is deformed in the thrust motion and the feed motion is the Z direction. To excite the second bending vibration mode in the vibrator 100, the piezoelectric element 102 has two electrodes made separate in the X direction which is the longitudinal direction.

These two bending vibration modes (i.e. the first and second bending vibrations) are simultaneously excited, and the two bending vibrations which are orthogonal to each other are superposed. As a result, the vertical motion (indicated by the arrow P) and the pendulum motion (indicated by the two-headed arrow Q) are combined, whereby the protrusions 101a each perform elliptic motion indicated by an arrow R on an X-Z plane. By performing the elliptic motion R, the vibrator 100 can move in the X direction relative to the sliding member 104 which is brought into pressure contact with the vibrator 100.

Figure 3A:
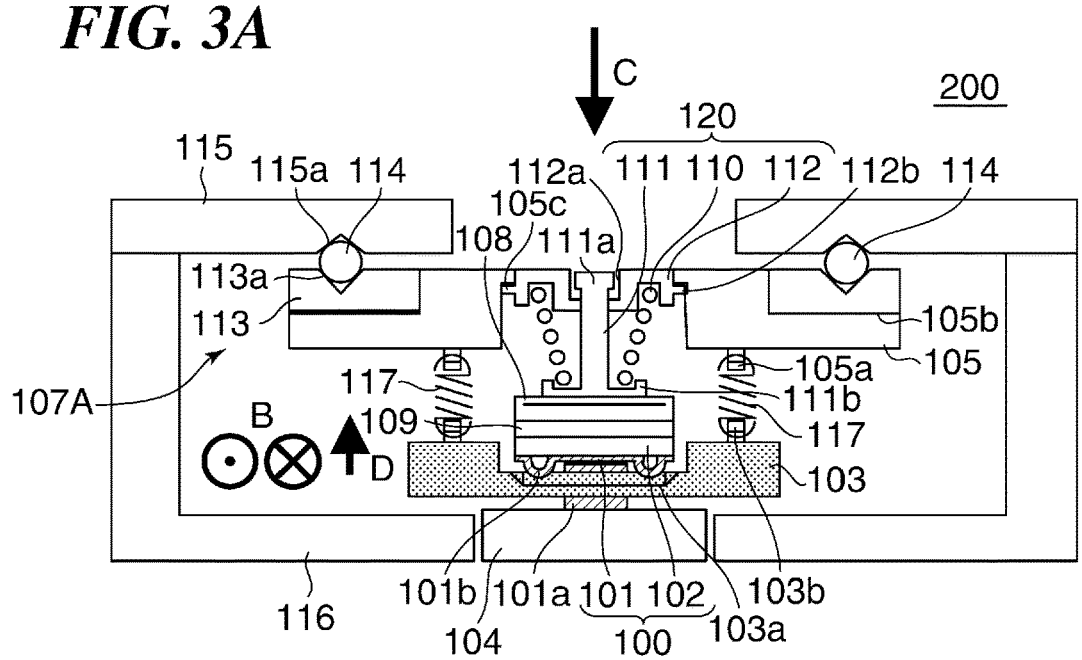
FIGS. 3A to 3D are diagrams useful in explaining the ultrasonic motor.
Figure 3B:
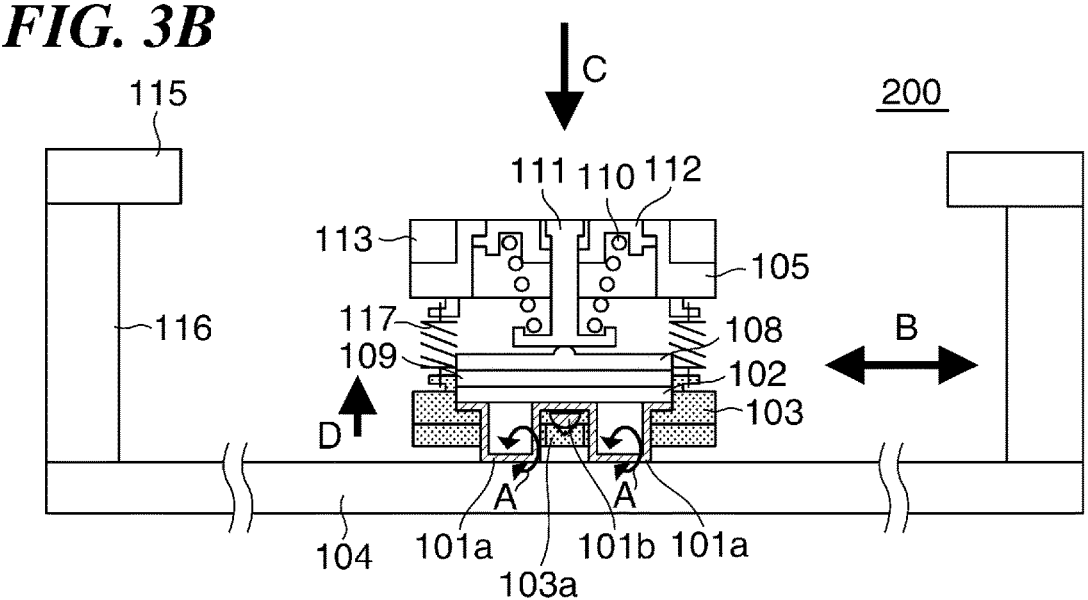
Figure 3C:
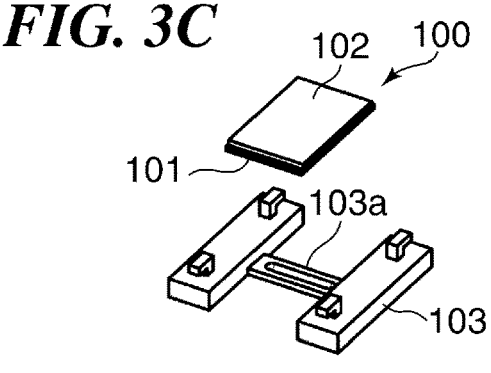
Figure 3D:
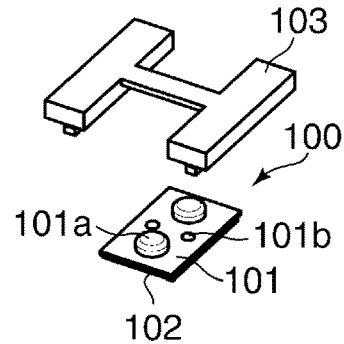

FIGS. 3A to 3D are diagrams useful in explaining the ultrasonic motor according to the first embodiment. FIG. 3A shows a cross-section of essential parts of the ultrasonic motor in a direction orthogonal to the driving direction. FIG. 3B shows a cross-section of the essential parts of the ultrasonic motor in the driving direction (moving direction). FIG. 3C is an exploded perspective view of the vibrator used in the ultrasonic motor, as viewed from above in FIG. 3A, which is useful in explaining how the vibrator is held. FIG. 3D is an exploded perspective view of the vibrator, as viewed from below in FIG. 3A, which is useful in explaining how the vibrator is held. Although in the first embodiment, a so-called direct-type (linear-type) ultrasonic motor is described by way of example, the ultrasonic motor may be of a rotary type or of any other type.

The illustrated ultrasonic motor, denoted by reference numeral 200, includes the vibration plate 101, and the vibration plate 101 is held by a first holding member 103. The piezoelectric element 102 is fixed on the vibration plate 101 e.g. with an adhesive. The piezoelectric element 102 is configured to generate resonance vibration in the vibration plate 101 in each of the longitudinal direction and the transverse direction when a high-frequency drive voltage is applied. The vibration plate 101 and the piezoelectric element 102 form the vibrator 100, and when the high-frequency drive voltage is applied, the vibrator 100 generates ultrasonic vibration.

As indicated by arrows A in FIG. 3B, tip ends of the pressure-contact portions 101a formed on the vibration plate 101 each generate elliptic motion. By changing the frequency or the phase of the high-frequency drive voltage applied to the piezoelectric element 102, it is possible to change the rotational direction and elliptical ratio of the elliptic motion to thereby generate desired vibration.

The tip ends of the pressure-contact portions 101a are in frictional contact with the sliding member 104, and a driving force for moving the vibrator 100 relative to the sliding member 104 is generated by the elliptic motions of the pressure-contact portions 101a. This makes it possible to drive the vibrator 100 in a relative movement direction indicated by an arrow B (direction perpendicular to the sheet surface in FIG. 3A, which is a left-right direction in FIG. 3B).

Note that the relative movement direction corresponds to an optical axis direction in a lens barrel incorporating the ultrasonic motor. Further, the sliding member 104 is fixed to a unit supporting member 116, described hereinafter, by fastening means, such as screws.

On the surface having the pressure-contact portions 101a formed thereon, the vibration plate 101 has protrusions 101b which are smaller in height than the pressure-contact portions 101a. The protrusions 101b and a V-shaped groove 103a formed in the first holding member 103 are fitted (engaged) with each other, whereby the vibration plate 101 is connected to the first holding member 103.

In the connection (i.e. engagement) between the protrusions 101b and the V-shaped groove 103a, the contact portions between them are positioned between the piezoelectric element 102 and the sliding member 104. This makes it possible to make effective use of a lower space, as viewed in FIG. 3A.

On the other hand, opposite ends of the first holding member 103 in the direction orthogonal to the driving direction of the ultrasonic motor are each formed with a spring hooking portion 103b, and one end of a holding spring 117 as a holding force-generating unit is hooked on the spring hooking portion 103b. The other end of the holding spring 117 is hooked on an associated one of spring hooking portions 105a formed on a second holding member 105. This arrangement generates a holding force for holding the vibrator 100 having the vibration plate 101 in a holding direction D via the first holding member 103.

On the other hand, a pressurizing force in a pressurizing direction C, described hereinafter, is applied to the vibrator 100. The holding direction D and the pressurizing direction C are substantially parallel to each other and opposite to each other, and the pressurizing force is set to be larger than the holding force. As a result, the pressurizing force receives a reaction force of the holding force, whereby the vibrator 100 is held. This causes the first holding member 103 and the vibrator 100 to be connected via the protrusions 101b and the V-shaped groove 103a without looseness in the driving direction B.

Note that a pressurizing unit (pressurizing mechanism) 120 is configured to generate a pressurizing force larger than the holding force, as the pressurizing force required for pressure contact between the vibrator 100 and the sliding member 104. This makes it possible to ensure the necessary holding force and the pressurizing force applied to the pressure contact portions even after the holding force in the direction indicated by an arrow D is subtracted from the pressurizing force in the direction indicated by the arrow C.

A pressurization plate 108 presses and holds the piezoelectric element 102 with flexibility via an elastic member 109. A pressurizing spring 110 is assembled between a spring holding member 111 and a spring base plate 112, to form the pressuring unit 120. Further, the pressurizing spring 110 generates the pressurizing force in the pressurizing direction C. To this end, a large-diameter portion 111a formed on one end of the spring holding member 111 is loosely fitted and assembled in a fitting portion 112a of the spring base plate 112. As a result, after assembly, it is possible to maintain the pressurizing unit 120 in a predetermined state against the spring force of the pressurizing spring 110. As described above, the first holding member 103 is not disposed between the pressurizing unit 120 and the vibrator 100 in the pressurizing direction.

An outer-diameter portion of the spring base plate 112 is formed with bayonet protrusions 112b at a plurality of locations in a circumferential direction. In the assembled state of the ultrasonic motor 200, the bayonet protrusions 112b have their locations in the pressurizing direction C defined by a bayonet engagement portion 105c formed on the second holding member 105. At this time, a pressing portion 111b formed at the other end of the spring holding member 111 generates the pressurizing force for pressing the vibrator 100 against the sliding member 104 via the pressurization plate 108 and the elastic member 109 using the urging force of the pressurizing spring 110. With this, the vibrator 100 and the sliding member 104 are brought into frictional contact with each other.

A moving plate 113 as a component of a guide section 107A is fixed to a contact portion 105b of the second holding member 105 by bonding or screwing. The moving plate 113 is formed with a plurality of grooves 113a each having a V-shaped cross section, for guiding the second holding member 105 in the optical axis direction, and balls 114 are fitted in the grooves 113a. A cover plate 115 is fixed to the unit supporting member 116 with screws.

The cover plate 115 is also a component of the guide section 107A, and is formed with grooves 115a each having a V-shaped cross section, at respective locations opposed to the grooves 113a formed in the moving plate 113. Further, the balls 114 are sandwiched and held by the grooves 113a and 115a. This makes it possible to support the second holding member 105 such that it can be moved forward and backward along the moving direction (the direction perpendicular to the sheet surface in FIG. 3A, and the left-right direction in FIG. 3B).

Figure 4A:
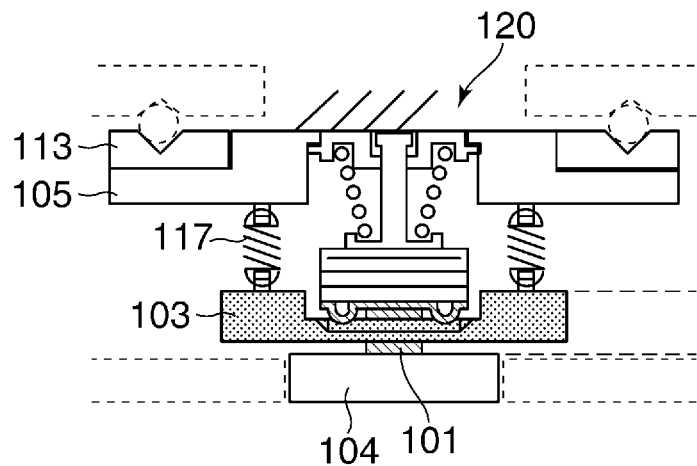
FIGS. 4A to 4D are diagrams useful in explaining an operation performed when the ultrasonic motor has variations in dimensions.
Figure 4B:
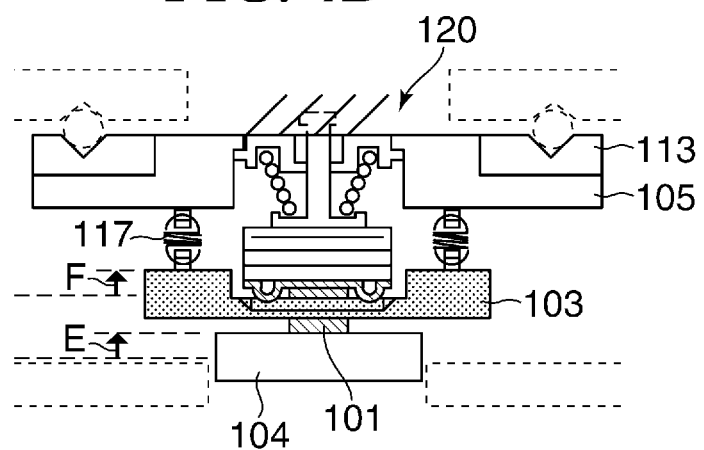
Figure 4C:
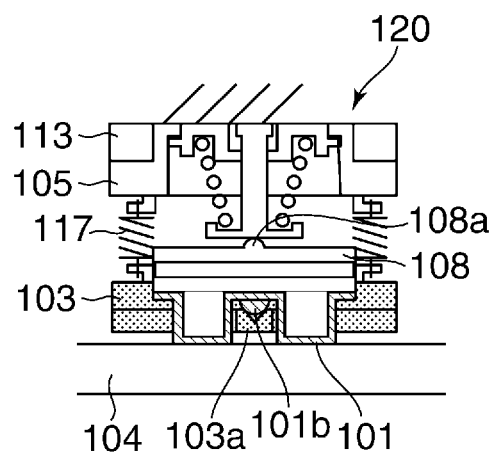
Figure 4D:
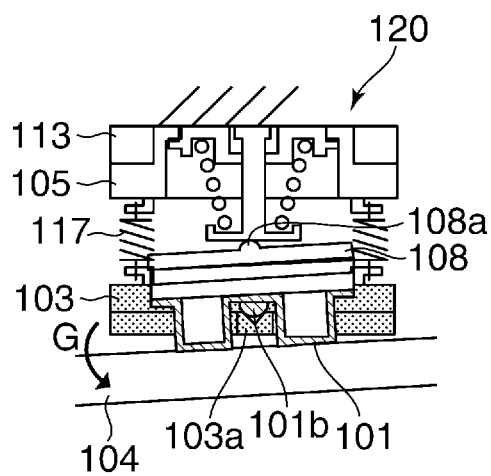

FIGS. 4A to 4D are diagrams useful in explaining an operation performed when variations in dimensions are caused in the ultrasonic motor, shown in FIGS. 3A to 3D. FIG. 4A shows a normal state of the sliding member as viewed from the same direction in FIG. 3A, while FIG. 4B shows a state of variation in the mounting level of the sliding member. FIG. 4C shows the normal state of the sliding member as viewed from the same direction in FIG. 3B, while FIG. 4D shows a tilted state of the sliding member.

Now, a description will be given of operation of the ultrasonic motor shown in FIGS. 3A to 3D, for stably maintaining the frictional contact between the vibrator 100 and the sliding member 104 by absorbing an influence caused by variations in dimensions of the components, with reference to FIGS. 4A to 4D.

In the ultrasonic motor 200 shown in FIGS. 3A to 3D, the heights of the vibrator 100 and the sliding member 104 in the pressurizing direction C are sometimes varied due to manufacturing variation of the mechanical components. Therefore, it is necessary to prevent the frictional contact state from being affected by the variations in height so as to stabilize the transmission of the driving force.

FIG. 4A shows the normal state of the ultrasonic motor 200 in which the sliding member 104 is at the center of the designed height in the pressurizing direction C. Further, FIG. 4B shows a state of the same in which the mounting level of the sliding member 104 is shifted upward in an exaggerated manner.

Referring to FIG. 4A, the pressurizing unit 120 is stretched, with the moving plate 113 and the second holding member 105 as one end, whereby the vibrator 100 is pressurized on the sliding member 104, with a plurality of members held between the one end and the vibrator 100. Further, the holding springs 117 pull the first holding member 103 toward the second holding member 105, whereby the holding force is generated.

Now, referring to FIG. 4B, let it be assumed that the mounting level of the sliding member 104 is shifted upward by a height indicated by an arrow E. The change in level indicated by the arrow E is absorbed by elastic deformation of the holding springs 117, and the first holding member 103 is pulled up by a height indicated by an arrow F in a state maintaining the holding force. The change in level, indicated by the arrow E, is small, and hence a change in the holding force, generated by elastic deformation of the holding springs 117, is sufficiently small with respect to the original holding force. Therefore, it is possible to absorb the variation in the level of the sliding member 104 while maintaining the necessary holding force.

Next, a case where the sliding member 104 is tilted will be described with reference to FIGS. 4C and 4D.

FIG. 4C shows the normal state of the sliding member 104. The mechanism for generating the holding force is as described above with reference to FIG. 4A.

Referring to FIG. 4D, let it be assumed that the sliding member 104 is mounted in a position rotated in an anti-clockwise direction as indicated by an arrow G. In this case, the rotation indicated by the arrow G is absorbed by rotation of the vibrator 100 about the protrusions 101b in the direction indicated by the arrow G. The vibrator 100 is relatively rotated in a state in which the connection thereof is maintained by the V-shaped groove 103a formed in the first holding member 103 and the protrusions 101b formed on the vibration plate 101.

Similarly, the pressurization plate 108 is rotated in the direction indicated by the arrow G about a semi-spherical portion 108a formed on a portion in contact with the pressurizing unit 120. Since the pressurizing unit 120 is in contact with the semi-spherical portion 108a of the pressurization plate 108, the pressurizing unit 120 can maintain the pressurizing state even when the pressurization plate 108 is rotated.

As described above, in the ultrasonic motor shown in FIGS. 3A to 3D, it is possible to absorb an influence caused by variation in the mounting level of the sliding member, to thereby stably maintain the frictional contact between the vibrator 100 and the sliding member 104.

Figure 5A:
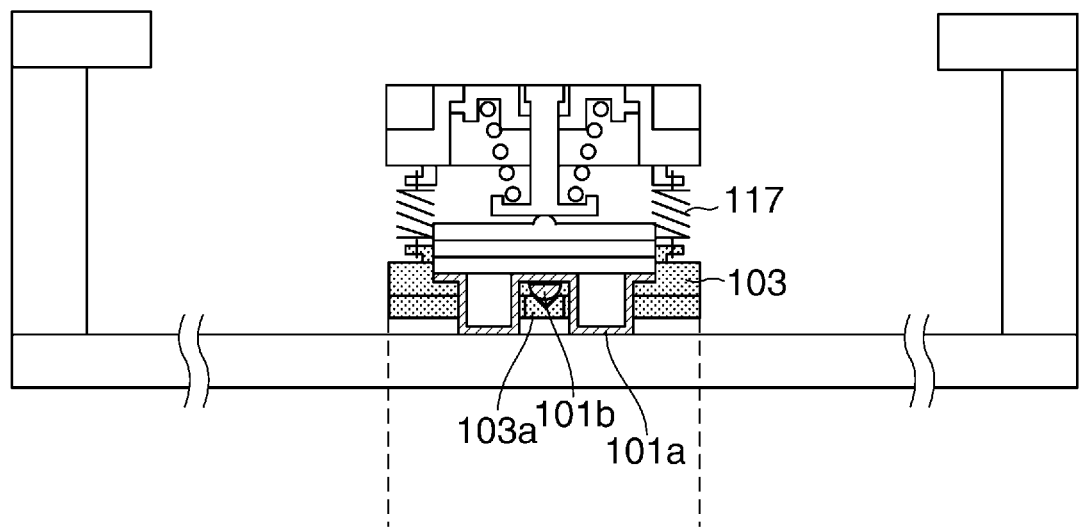
FIGS. 5A and 5B are diagrams useful in explaining advantageous effects obtained by the ultrasonic motor.
Figure 5B:
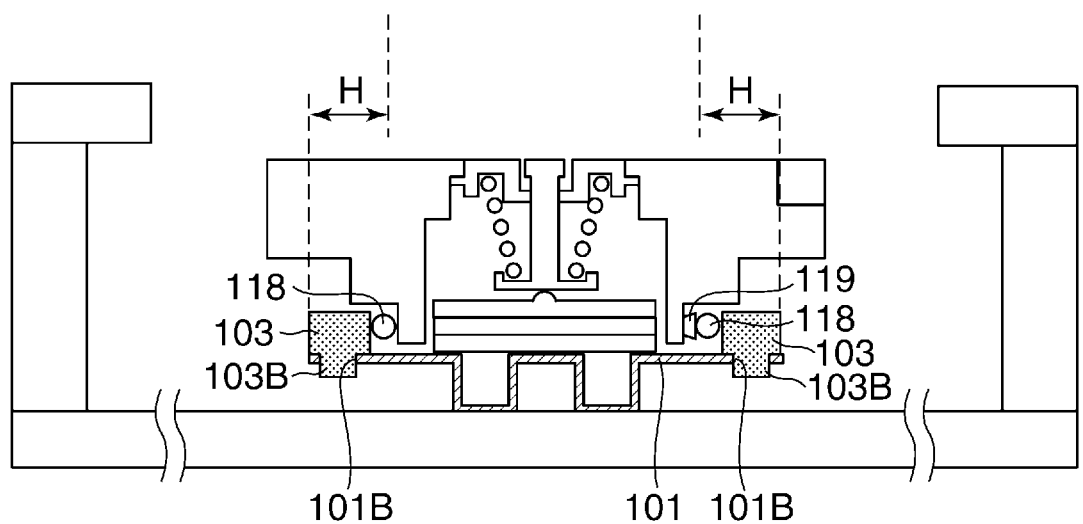

FIGS. 5A and 5B are diagrams useful in explaining advantageous effects obtained by the ultrasonic motor shown in FIGS. 3A to 3D. FIG. 5A is a cross-sectional view taken along the driving direction of the ultrasonic motor, which corresponds to FIG. 3B, and FIG. 5B is a cross-sectional view of a conventional ultrasonic motor, taken along the driving direction.

In the conventional ultrasonic motor shown in FIG. 5B, the vibrator 100 is held by the first holding member 103 in such a manner that the connection portions (protruding portions) 101B of the vibration plate 101, extending in the driving direction, are fixed to the protrusions 103B formed on the first holding member 103. Further, rolling rollers 118 are provided at opposite ends of the vibration plate 101 in the driving direction, and the vibrator 100 is held by an urging spring 119 without looseness. Note that the operation and the like of the illustrated conventional ultrasonic motor are already known, and hence description thereof is omitted.

In contrast, in the ultrasonic motor shown in FIG. 5A, the vibrator 100 is connected to the first holding member 103 by the protrusions 101b formed on the vibration plate 101 and the V-shaped groove 103a formed in the first holding member 103 at the center of the ultrasonic motor in the driving direction. Further, the holding springs 117 are arranged in the direction orthogonal to the driving direction. This eliminates the need of provision of holding portions (i.e. the connection portions 101B described above) extending in the driving direction, whereby it is possible to reduce the length in the driving direction by lengths each indicated by an arrow H in FIG. 5B.

As described above, in the ultrasonic motor shown in FIG. 5A, it is possible to reduce the dimension in the driving direction (traveling direction) and perform connection without looseness.

Figure 6:
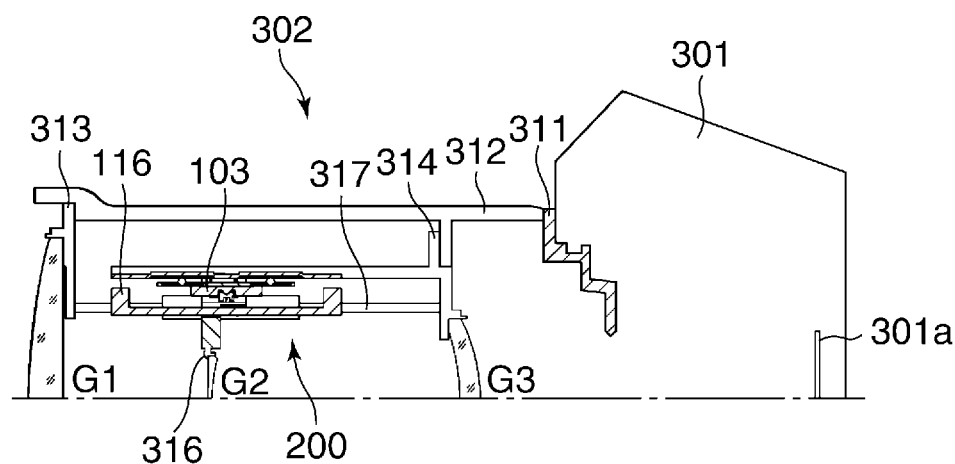
FIG. 6 is a diagram useful in explaining a lens barrel as an example of an electronic apparatus incorporating the ultrasonic motor.

FIG. 6 is a diagram useful in explaining a lens barrel as an example of an electronic apparatus (lens apparatus) incorporating the ultrasonic motor 200 shown in FIGS. 3A to 3D. Note that in FIG. 6, the lens barrel has a substantially rotationally symmetric shape, and hence only the upper half of the lens barrel is illustrated.

The lens barrel, denoted by reference numeral 302, is mounted on a camera body 301 in a removable manner, and the camera body 301 is provided with an image pickup device 301a. A mount 311 of the camera body 301 is provided with a bayonet portion for mounting the lens barrel 302 to the camera body 301.

The lens barrel 302 includes a fixed barrel 312, which is brought into contact with a flange portion of the mount 311. The fixed barrel 312 and the mount 311 are fixed with screws (not shown). A front barrel 313 which holds an optical lens (hereinafter simply referred to as the lens) G1 and a rear barrel 314 which holds a lens G3 are fixed to the fixed barrel 312. The lens barrel 302 includes a focus lens-holding frame 316, and a lens G2 is held by the focus lens-holding frame 316.

The focus lens-holding frame 316 is held on a guide bar 317 held by the front barrel 313 and the rear barrel 314, in a rectilinearly movable manner. The unit supporting member 116 of the ultrasonic motor 200 is formed with a flange portion (not shown), and the unit supporting member 116 is fixed to the rear barrel 314 via the flange portion e.g. with screws.

In the ultrasonic motor 200, when the movable unit including the first holding member 103 is driven, the driving force of the ultrasonic motor 200 is transmitted to the focus lens-holding frame 316 via the first holding member 103. Then, the focus lens-holding frame 316 is guided by the guide bar 317, and is rectilinearly moved. With this, focus adjustment is performed.

As described above, in the first embodiment of the present invention, the vibrator is connected at the center of the vibrator in the driving direction. Then, the holding force necessary for holding the connection portion is generated in the direction orthogonal to the driving direction. This makes it possible to reduce the dimension of the vibrator of the ultrasonic motor in the driving direction.

Next, a description will be given of an ultrasonic motor as a motor according to a second embodiment of the present invention.

Figure 7:
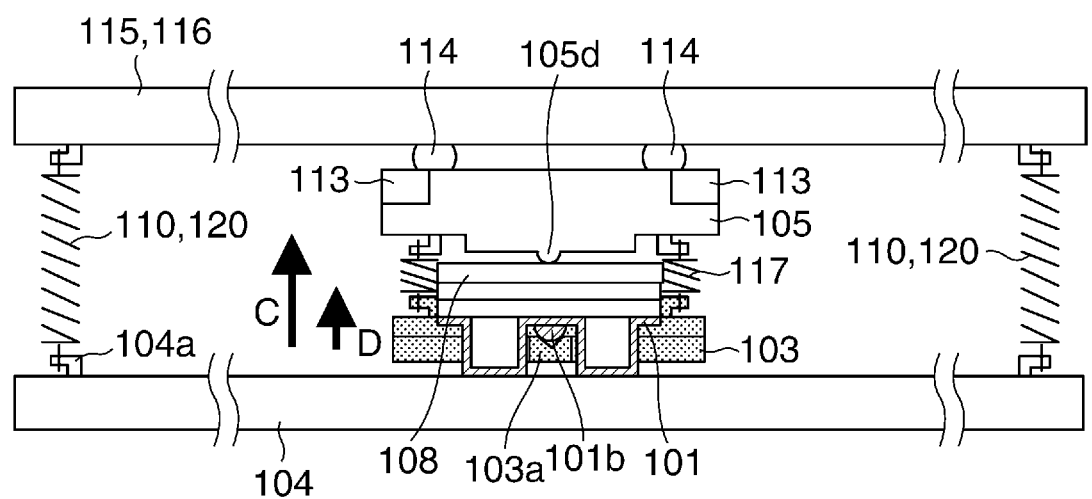
FIG. 7 is a cross-sectional view of essential parts of an ultrasonic motor as a motor according to a second embodiment of the present invention in a driving direction.

FIG. 7 is a cross-sectional view of essential parts of the ultrasonic motor as the motor according to the second embodiment in the driving direction. Note that description of the same configuration of the ultrasonic motor as the motor according to the second embodiment as that described in the first embodiment is omitted, and the following description is given only of different points.

As described hereinabove, the vibrator 100 is connected to the first holding member 103 by engaging the protrusions 101b and the V-shaped groove 103a formed in the first holding member 103 with each other, and is held by the holding force generated by the holding springs 117 in the direction indicated by the arrow D.

The second embodiment differs from the first embodiment in the configuration for generating a pressurizing force. Referring to FIG. 7, the sliding member 104 is not fixed to the unit supporting member 116, but one ends of the pressurizing springs 110 are hooked on spring hooking portions 104a, respectively. Further, the other ends of the pressurizing springs 110 are hooked on the unit supporting member 116. With this, the sliding member 104 is pulled up in the direction indicated by the arrow C, to thereby generate the pressurizing force for pressurizing the vibrator 100.

Further, in FIG. 7, the pressurization plate 108 is not formed with a semi-spherical portion, but the second holding member 105 is formed with a semi-spherical portion 105d, whereby the variation in the mounting level of the sliding member 104 is absorbed in the above-described manner.

In the second embodiment, the direction D in which the holding force is generated and the direction C in which the pressurizing force is applied are the same direction, as viewed from the sliding member 104. For this reason, the offset of the forces described in the first embodiment is not generated. Therefore, it is unnecessary to cause the pressurizing spring 110 to generate the pressurizing force large enough to have a margin for overcoming the offset to provide the holding force.

As described above, in the second embodiment of the present invention, similar to the first embodiment, it is possible to reduce the dimension in the driving direction, and further, it is possible to set the pressurizing force applied by the pressurizing unit, such as the pressurizing spring, without considering the holding force.

Next, a description will be given of an ultrasonic motor as a motor according to the third embodiment of the present invention.

Figure 8A:
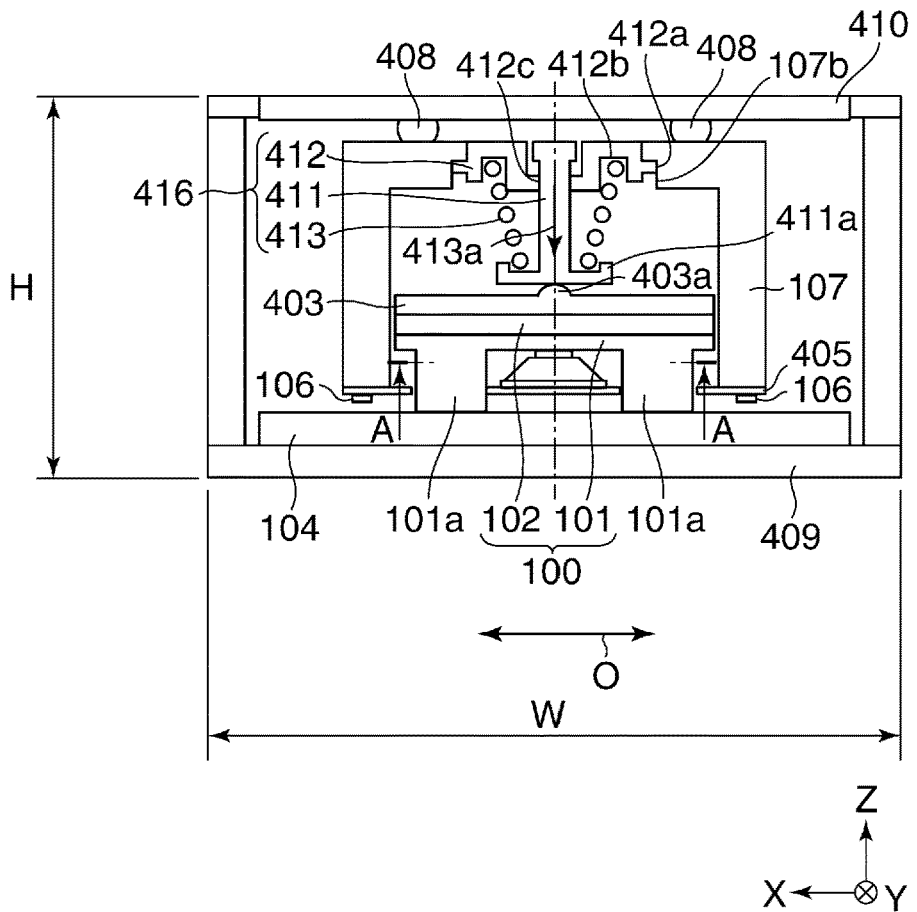
FIGS. 8A and 8B are diagrams useful in explaining an ultrasonic motor as a motor according to a third embodiment of the present invention.
Figure 8B:
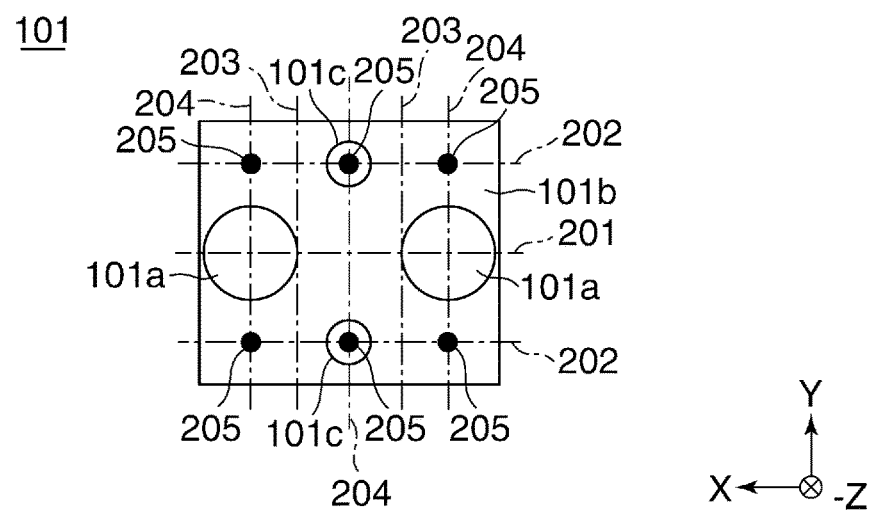

FIGS. 8A and 8B are diagrams useful in explaining the ultrasonic motor as the motor according to the third embodiment. FIG. 8A shows the ultrasonic motor in cut-away, as viewed from the side, and FIG. 8B is a cross-sectional view of the vibrator taken along A-A in FIG. 8A. Components corresponding to those of the vibrator shown in FIGS. 1A and 1B, and those of the ultrasonic motor as the motor according to the first embodiment, shown in FIGS. 3A to 3D, are denoted by the same reference numerals.

The illustrated ultrasonic motor, denoted by reference numeral 151, has the vibrator 100, described with reference to FIGS. 1A and 1B, disposed at the center of the lower part thereof. As described above, the vibrator 100 as the drive source includes the vibration plate 101 and the piezoelectric element 102, and the high-frequency drive voltage is applied to the piezoelectric element 102. The vibration plate 101 is joined to the piezoelectric element 102 e.g. with an adhesive, and generates ultrasonic vibrations according to the high-frequency drive voltage applied to the piezoelectric element 102.

The vibration plate 101 is formed with the two protrusions 101a, and a pressure receiving member 403 is affixed to the upper surface of the piezoelectric element 102 e.g. with an adhesive. Further, the pressure receiving member 403 is formed with a semi-spherical portion 403a in a central portion thereof in the Z direction. The vibrator 100 is engaged with a thin plate spring 405 formed of spring steel.

FIG. 8B shows a state of the vibrator 100 as viewed from the Z direction. FIG. 8B shows positions corresponding to the antinode 201 and the nodes 202 of the first bending vibration, positions corresponding to the antinodes 203 and the nodes 204 of the second bending vibration, and positions corresponding to six node intersections 205 which are intersections of the nodes 202 and the nodes 204.

FIGS. 9A to 9D are diagrams useful in explaining how the vibrator is held in the ultrasonic motor, shown in FIGS. 8A and 8B. FIG. 9A shows how the vibrator is held, in cut-away, as viewed from the side, FIG. 9B shows the vibrator, as viewed from the bottom, FIG. 9C is a cross-sectional view, taken along B-B in FIG. 9A, showing how the vibrator is held, and FIG. 9D is a cross-sectional view of a variation showing how the vibrator is held.

The vibration plate 101 is formed with engagement portions 101c extending in a −Z direction (direction opposite to the Z direction) from the surface on which the protrusions 101a are formed, at respective locations corresponding to or in the vicinity of the two node intersections 205. Each engagement portion 101c is formed integrally with a convex-shaped portion 101ca having its tip end formed into a semi-spherical shape e.g. by press-forming.

Engagement receiving portions 121 for receiving the engagement portions 101c are fixed to the thin plate spring 405 e.g. by welding or adhesion at respective locations adjusted by gauging to the same locations of the engagement portions 101c in the −Z direction. The engagement receiving portions 121 each have a cone-shaped recess 121a for receiving an associate one of the convex-shaped portions 101ca in the −Z direction. The locations of the recesses 121a are adjusted by gauging such that the recesses 121a are made coaxial with the convex-shaped portions 101ca.

Note that in the present embodiment, a two-component part formed by the engagement portion 101c and the engagement receiving portion 121 which are engaged with each other is referred to as a vibrator engagement part. Further, the engagement receiving portions 121 and the thin plate spring 405 are referred to as a vibrator holding member 131, and the engagement portions 101c of the vibrator 100 and the vibrator holding member 131 are collectively referred to as a vibrator holding section.

Further, the thin plate spring 405 is formed with two escape holes 405b, in which the two protrusions 101a of the vibrator 100 are fitted to thereby prevent interference between the thin plate spring 405 and the two protrusions 101a of the vibrator 100. Further, the thin plate spring 405 has screw holes 405c formed in respective four corners thereof, for fixing the thin plate spring 405 to a guide member 107, referred to hereinafter. The thin plate spring 405 is fixed to the guide member 107 with fixing screws 106. With this, the driving force of the vibrator 100 in the X direction is transmitted to the guide member 107.

Note that the vibrator engagement parts each formed by the engagement portion 101c and the engagement receiving portion 121 are designed to be accommodated in a space around the protrusions 101a of the vibrator 100.

Referring again to FIG. 8A, a pressurizing mechanism (pressurizing unit) 416 for pressurizing the vibrator 100 in the −Z direction is disposed within the guide member 107. The pressurizing unit 416 includes a pressurizing shaft 411, a pressurizing spring-receiving member 412, and a pressurizing spring 413. The pressurizing spring-receiving member 412 has a bayonet shape portion 412a in an outer periphery thereof. The bayonet shape portion 412a is fitted in a bayonet hole-shaped portion 107b which is formed in an inner periphery of a central upper portion of the guide member 107 in the Z direction. The pressurizing shaft 411 is fitted in a center hole 412c formed in the pressurizing spring-receiving member 412 in the Z direction in an axially movable manner.

The pressurizing spring 413 has an upper end thereof in the Z direction, inserted in a spring receiving groove 412b formed in the pressurizing spring-receiving member 412, and this inserted end is a fixed end. Further, the pressurizing spring 413 has a portion as a movable end, which is brought into contact with a spring receiving portion 411a, located at an end of the pressurizing shaft 411 in the −Z direction, and generates a pressurizing force 413a in the Z direction in a compressed state.

The pressurizing force 413a generated by the pressurizing spring 413 presses the spring receiving portion 411a downward in the −Z direction to thereby pressurize the semi-spherical portion 403a of the pressure receiving member 403 joined to the vibrator 100. When the semi-spherical portion 403a is pressurized, a force in the −Z direction acts on the vibrator 100 to deform the thin plate spring 405 engaged with the vibrator 100, and bring the protrusions 101a into pressure contact with the sliding member 104.

In this state, the dimensional relationship between the related components in the pressurizing direction is defined such that the thin plate spring 405 holding the vibrator 100 is bent in the −Z direction (bending of the thin plate spring 405 is omitted from illustration in FIG. 8A). With this, a reaction force 405a (see FIG. 9C) of the thin plate spring 405 is generated in the Z direction. Then, the cone-shaped recesses 121a of the engagement receiving portions 121 are brought into constant pressure contact with the convex-shaped portions 101ca of the engagement portions 101c to thereby prevent looseness of the vibrator engagement parts of the vibrator 100 in the X, Y, and Z directions. This prevents generation of looseness in the vibrator engagement parts in the driving direction (X direction) during driving of the vibrator 100.

Further, as the spring characteristics of the thin plate spring 405, the thin plate spring 405 has no rigidity (i.e. is easily bent) in a direction orthogonal to the flat surface thereof (Z direction), but has rigidity in a direction orthogonal to the Z direction (X direction) (i.e. prevents generation of looseness). This prevents generation of looseness in the vibrator holding section in the driving direction during driving of the vibrator 100. Further, bending of the thin plate spring 405 in the pressurizing direction makes it easy to equalize the posture of the vibrator 100 with respect to the sliding member 104.

Note that in the above-described example, to reduce an error from the design value of the pressurizing force 413a, caused by accumulation of manufacturing errors in the respective dimensions in the pressurizing direction of components of the vibration motor in the assembled state, a compression coil spring having a small spring constant is used as the pressurizing spring 413. On the other hand, in order to make the ultrasonic motor 151 compact in size, a plate spring may be used as the pressurizing spring 413 to thereby reduce a space in which the components are arranged, whereby the dimension of the ultrasonic motor 151 in the pressurizing direction may be reduced.

A unit base 409 is used to support the whole ultrasonic motor 151. The sliding member 104 made of metallic material, which is brought into frictional contact with the vibrator 100, is fixed to a bottom side of the unit base 409, and a top plate 410 is fixed to a top side of the unit base 409. Four rolling members 408 are sandwiched between the top plate 410 and the guide member 107. When the rolling members 408 roll in a state sandwiched between the top plate 410 and the guide member 107, the guide member 107 is moved in the X direction.

Figure 10A:
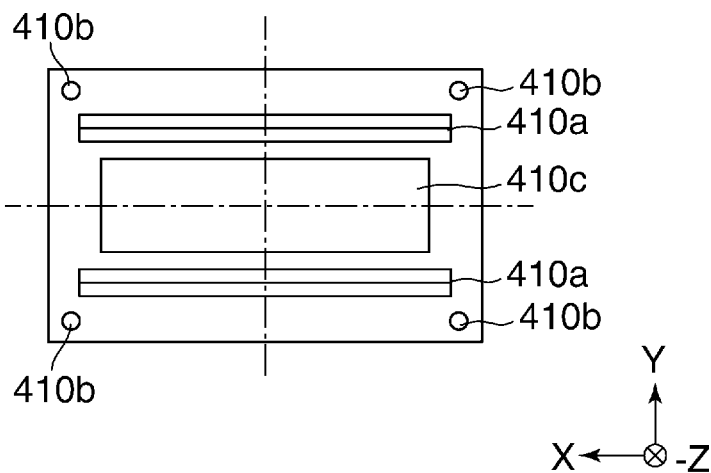
FIGS. 10A to 10D are diagrams useful in explaining a top plate and a guide member used in the ultrasonic motor shown in FIGS. 8A and 8B.
Figure 10B:
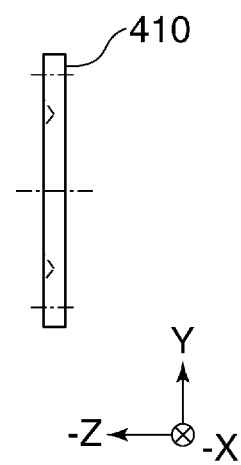
Figure 10C:
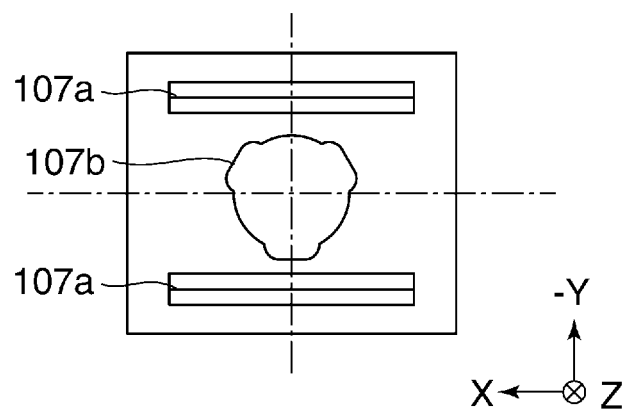
Figure 10D:
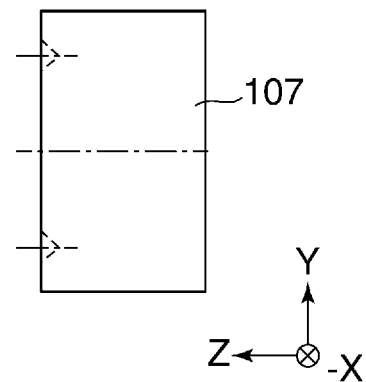

FIGS. 10A to 10D are diagrams useful in explaining the top plate and the guide member which are used in the ultrasonic motor shown in FIGS. 8A and 8B. FIG. 10A shows the top plate, as viewed from the bottom and FIG. 10B shows the top plate, as viewed from the side. FIG. 10C shows the guide member, as viewed from the above, and FIG. 10D shows the guide member, as viewed from the side.

The top plate 410 is formed with two V-shaped guide grooves 410a, and the guide member 107 is also formed with two V-shaped guide grooves 107a. The rolling members 408 are sandwiched between these guide grooves 410a and 107a, and roll between the grooves.

The guide member 107 is formed with the bayonet hole-shaped portion 107b for fitting the pressurizing unit 416. Further, the top plate 410 is formed with a square hole 410c for fixing/removing the pressurizing unit 416 and screw holes 410b for fixing the top plate 410 to the unit base 409.

As described above, in the ultrasonic motor 151 shown in FIGS. 8A and 8B, the pressurizing unit 416 presses the vibrator 100 against the sliding member 104, and the protrusions 101a are brought into frictional contact with the sliding member 104. Then, when the high-frequency drive voltage is applied to the piezoelectric element 102 to excite ultrasonic vibrations in the vibrator 100, the driving force is generated by a frictional force generated between the protrusions 101a and the sliding member 104. As a result, the vibrator 100 is moved relative to the sliding member 104 in the X direction (strictly, in the X direction or in the −X direction opposite to the X direction) indicated by a two-headed arrow O in FIG. 8A.

Since the convex-shaped portions 101ca of the engagement portions 101c and the cone-shaped recesses 121a of the engagement receiving portions 121 are engaged with each other, the driving force is transmitted to the thin plate spring 405 in accordance with movement of the vibrator 100 in the X direction, and is further transmitted to the guide member 107. Then, the rolling of the rolling members 408 causes the guide member 107 to move in the X direction.

As mentioned above, FIG. 9D shows the variation of the vibrator engagement parts. FIG. 9D shows the vibrator engagement parts in the same cross-sectional position as shown in FIG. 9C which are at the same locations and in the same direction as in FIG. 9C.

In FIG. 9D, the vibrator 100 has engagement portions 101d, each having a tip end shaft 101da at its tip end, which are formed at respective locations corresponding to the two node intersections 205 or in the vicinity of thereof. The engagement portions 101d are formed integrally with the vibration plate 101 e.g. by press-forming.

The thin plate spring 405 has engagement receiving portions 122, each having a hole-shaped portion 122a formed in its center. The tip end shafts 101*da* are fitted in the hole-shaped portions 122*a*, respectively, to thereby prevent looseness of the vibrator engagement parts in the X and Y directions.

As described above, the engagement portions integrally formed with the vibration plate 101 can be formed to have various shapes and function as part of the vibrator holding section. Although the description has been given of the example in which the vibrator 100 is moved and the sliding member 104 is fixed, the vibrator 100 may be fixed, and the sliding member 104 may be moved.

Figure 11:
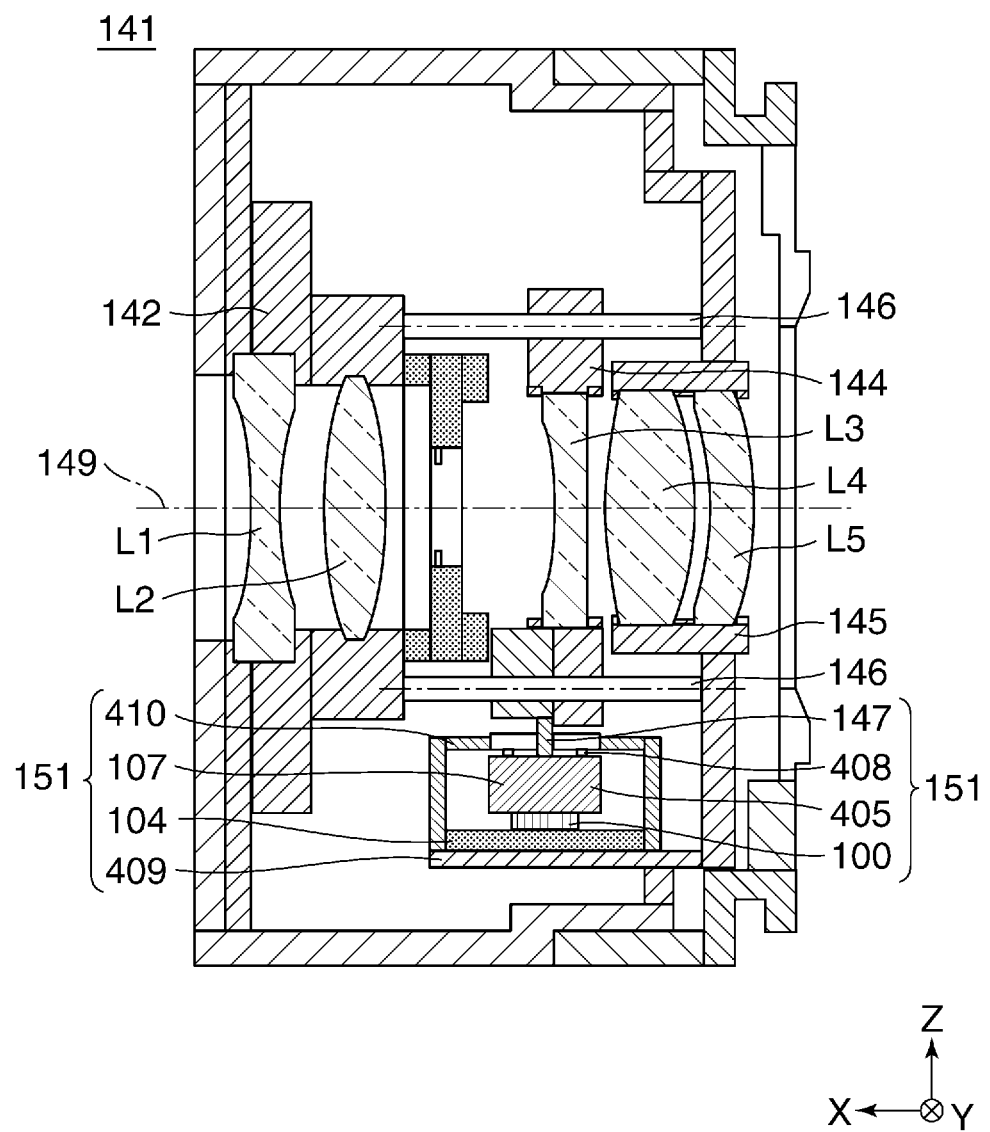
FIG. 11 is a diagram useful in explaining a lens barrel as an example of an electronic apparatus incorporating the ultrasonic motor shown in FIGS. 8A and 8B.

FIG. 11 is a diagram useful in explaining a lens barrel as an example of an electronic apparatus (lens apparatus) incorporating the ultrasonic motor shown in FIGS. 8A and 8B.

An image pickup optical system provided in the lens barrel, denoted by reference numeral 141, includes a first group lens L1 and a second group lens L2, disposed in the mentioned order from an object side, and a barrel 142 having the lenses L1 and L2 therein. A focus lens L3 is disposed at a location behind the second group lens L2, and is held by a lens holding frame 144. Further, a fourth group lens L4 and a fifth group lens L5 are disposed at respective locations behind the focus lens L3, and are held by a barrel 145.

Two main guide bars 146 are used for moving the lens holding frame 144 along an optical axis 149, and are fixed to an inner wall of the lens barrel 141, such that they extend in parallel with the optical axis 149. The ultrasonic motor 151 is arranged within the lens barrel 141, and in the present example, the unit base 409 is fixed to the inner wall of the lens barrel 141 in such a manner that the guide member 107 can move in the direction of the optical axis 149.

By connecting the guide member 107 and the lens holding frame 144 using a connection member 147, the driving force of the vibrator 100 is transmitted to the lens holding frame 144 to thereby move the focus lens L3 along the optical axis 149.

Here, a description will be given of the vibrator holding section of the ultrasonic motor, which holds the vibrator in a manner avoiding suppression of vibration of the vibrator as much as possible, and can be reduced in size.

Figure 12A:
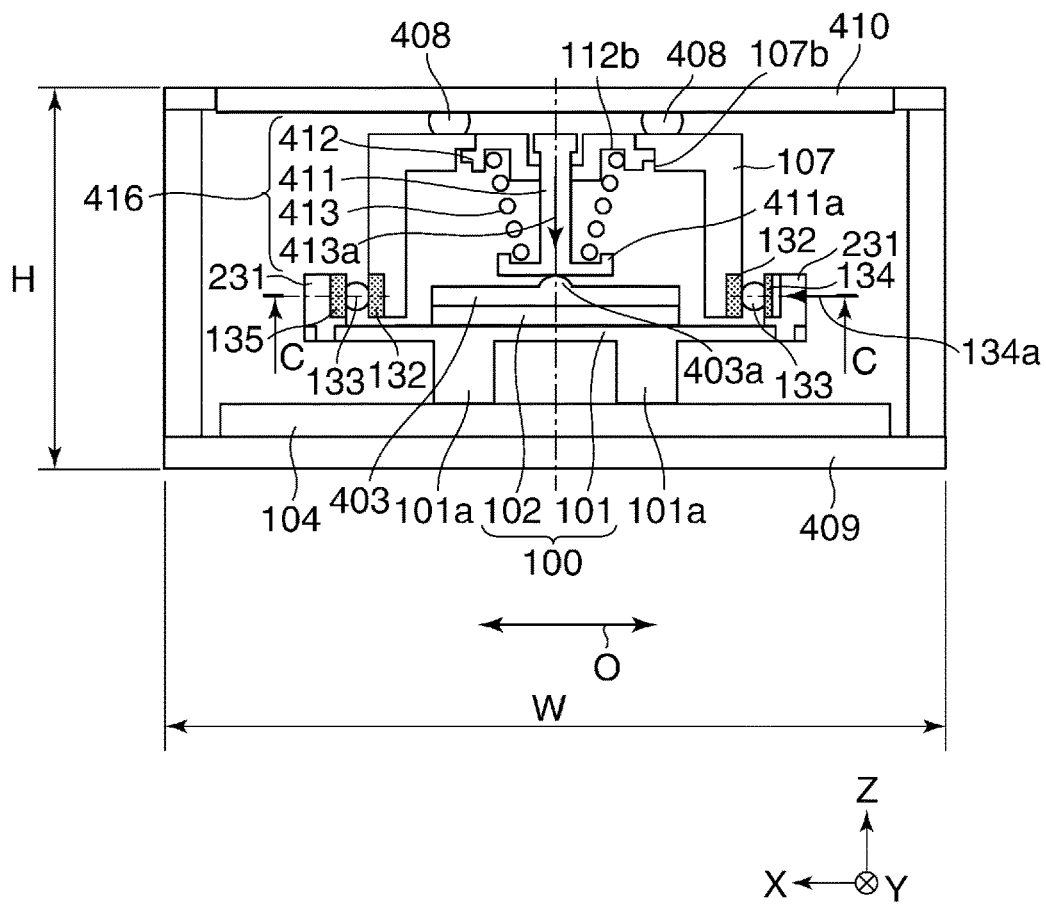
FIGS. 12A and 12B are diagrams useful in explaining the construction of a conventional ultrasonic motor.
Figure 12B:
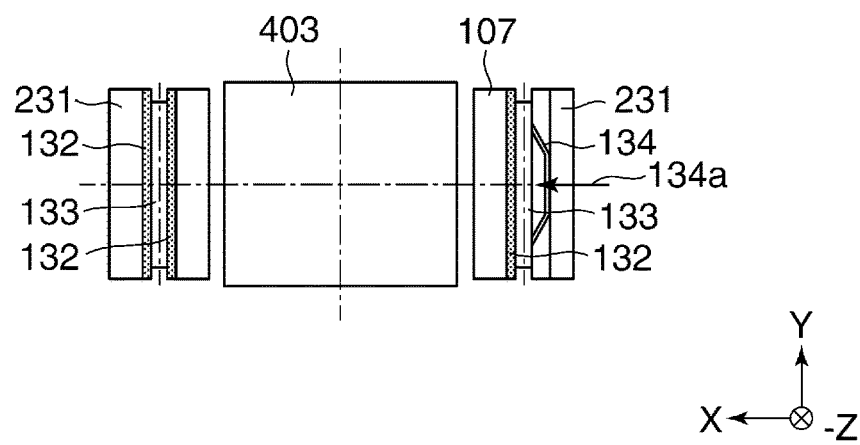

FIGS. 12A and 12B are diagrams useful in explaining an example of a conventional ultrasonic motor. FIG. 12A shows the conventional ultrasonic motor, in cut-away, as viewed from the side, and FIG. 12B is a cross-sectional view taken along C-C in FIG. 12A, which shows a vibrator holding section.

The ultrasonic motor, denoted by reference numeral 152, shown in FIG. 12A differs from the ultrasonic motor 151, shown in FIG. 8A, in the vibrator holding section, while the other components are configured similar to those of the ultrasonic motor shown in FIG. 8A, and hence description of the similar components is omitted.

Referring to FIGS. 12A and 12B, vibrator holding sections exist on opposite ends of the vibrator 100 in the longitudinal direction, and an engagement member 231 is fixed to each vibrator holding section. First, the vibrator holding section on the left side, as viewed in FIGS. 12A and 12B, will be described.

A roller receiving portion 135, made of metal, is fixed to the engagement member 231 as a measure against wear. Similarly, a roller receiving portion 132, made of metal, is fixed to the guide member 107. Further, a rolling roller member 133 is sandwiched between the two roller receiving portions 132.

Next, the vibrator holding section on the right side, as viewed in FIGS. FIGS. 12A and 12B, will be described.

Similar to the vibrator holding section on the left side, the roller receiving portion 132 is fixed to the guide member 107. A pressurization plate spring 134 for pressing the rolling roller member 133 is disposed on the engagement member 231. Further, the rolling roller member 133 is sandwiched between the roller receiving portion 132 and the pressurization plate spring 134.

In the vibrator holding sections shown in FIGS. 12A and 12B, the guide member 107 enters between the two engagement members 231 provided at the opposite ends of the vibrator 100 in the longitudinal direction. Further, the two rolling roller members 133 are disposed between the two roller receiving portions 132 attached to the guide member 107 and the roller receiving portion 135 and the pressurization plate spring 134 attached to the engagement members 231, whereby the pressurization plate spring 134 generates a pressurizing force 134*a* in the driving direction (X direction). That is, the pressurizing force 134*a* applied by the pressurization plate spring 134 prevents looseness of the vibrator 100 and the guide member 107 in the driving direction (X direction).

As a result, in the ultrasonic motor 152 shown in FIGS. 12A and 12B, a driving (control) position of the vibrator 100 in the X direction (direction indicated by an arrow O) is directly transmitted to the guide member 107, which improves driving controllability of the ultrasonic motor 152.

Incidentally, in the vibrator holding sections shown in FIGS. 12A and 12B, manufacturing tolerances of the sliding member 104, the vibrator 100, the guide member 107, the rolling members 408, the top plate 410, and the unit base 409 produce a dimensional error in the pressurizing direction (Z direction). Further, a change in the posture of the vibrator 100 during driving thereof changes the positional relationship between the vibrator 100 and the rolling members 408 in the pressurizing direction (Z direction). This generates looseness of the rolling members 408 between the guide member 107 and the top plate 410 in the pressurizing direction (Z direction). Further, this can cause a situation in which the rolling members 408 are tightly sandwiched between the guide member 107 and the top plate 410 in the pressurizing direction (Z direction).

For this reason, in the vibrator holding sections shown in FIGS. 12A and 12B, it is necessary to absorb a dimensional error (change in the positional relationship) in the pressurizing direction (Z direction). In the illustrated example, the two rolling roller members 133 are disposed between the two roller receiving portions 132 attached to the guide member 107 and the roller receiving portion 135 and the pressurization plate spring 134 attached to the engagement members 231 roll in the Z direction to thereby absorb the dimensional error (change) in the pressurizing direction (Z direction).

This is a function of the vibrator holding sections shown in FIGS. 12A and 12B for equalizing the vibrator 100 in the pressurizing direction (Z direction). That is, the vibrator holding sections shown in FIGS. 12A and 12B connect the vibrator 100 and the guide member 107, and have the function of eliminating looseness of the vibrator 100 in the driving direction (X direction) and the function of equalizing the same in the pressurizing direction (Z direction).

However, in the ultrasonic motor 152 shown in FIGS. 12A and 12B, the vibrator holding sections are arranged at the opposite ends of the vibrator 100. This requires an arrangement space for arranging the vibrator holding sections in the X direction, which increases a dimension W of the ultrasonic motor 152 in the X direction, resulting in an increase in the size of the ultrasonic motor 152. Even if the vibrator holding sections are arranged on the upper side of the vibrator 100 in the Z direction, an arrangement space in the Z direction is required, which increases a dimension H of the ultrasonic motor 152 in the Z direction, resulting in an increase in the size of the ultrasonic motor 152.

In contrast, in the ultrasonic motor 151 shown in FIGS. 8A and 8B, the vibrator holding section, except the portion used in fixing the thin plate spring 405 to the guide member 107, is accommodated in a dead space around the protrusions 101a, where there is no interference with the other components. This makes it possible to reduce the outer dimensions W and H of the ultrasonic motor 151, and thereby reduce the size of the ultrasonic motor 151.

Further, in the ultrasonic motor 151 shown in FIGS. 8A and 8B, the vibrator holding section is arranged such that it corresponds to the two node intersections 205 as the intersections of the nodes 202 of the first bending vibration and the node 204 of the second bending vibration of the vibrator 100. By thus holding the vibrator 100 at the locations having the minimum vibration amplitude of the vibrator 100, it is possible to hold the vibrator 100 in a manner avoiding suppression of vibration of the vibrator 100 as much as possible.

As described above, in the third embodiment of the present invention, it is possible to hold the vibrator in a manner avoiding suppression of vibration of the vibrator 100 as much as possible, and what is more, reduce the size of the ultrasonic motor.

Next, a description will be given of an ultrasonic motor according to a fourth embodiment of the present invention. The same components of the fourth embodiment as those of the third embodiment are denoted by the same reference numerals.

The ultrasonic motor according to the fourth embodiment differs from the ultrasonic motor according to the third embodiment in the vibrator holding section, and the other components are configured similar to those of the ultrasonic motor according to the third embodiment.

Figure 13A:
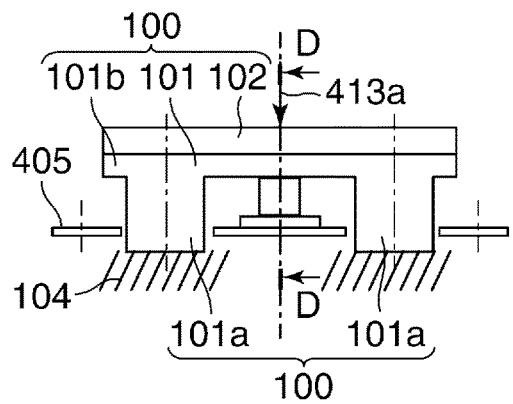
FIGS. 13A to 13D are diagrams useful in explaining how a vibrator is held in an ultrasonic motor as a motor according to a fourth embodiment of the present invention.
Figure 13C:
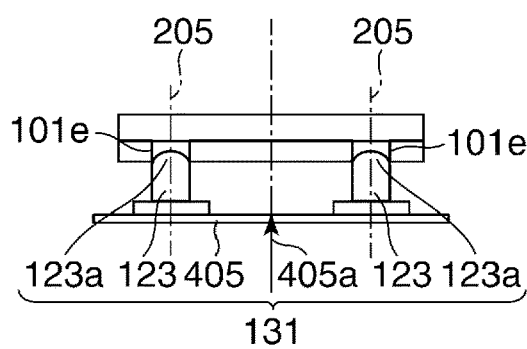
Figure 13B:
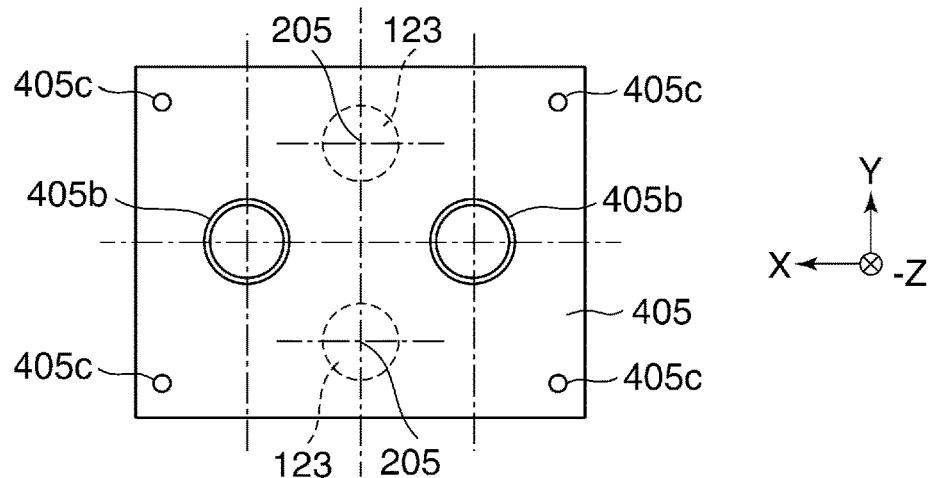
Figure 13D:
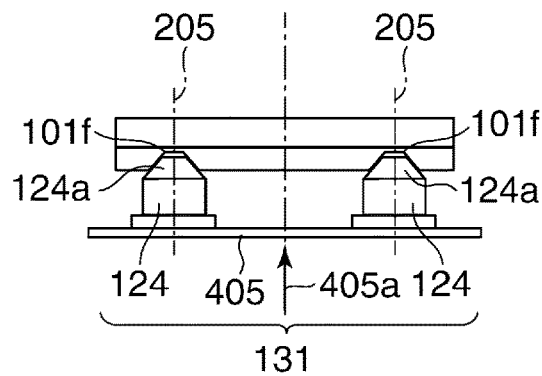

FIGS. 13A to 13D are diagrams useful in explaining how the vibrator is held in the ultrasonic motor according to the fourth embodiment. FIG. 13A shows how the vibrator is held, in cut-away, as viewed from the side, FIG. 13B shows the vibrator, as viewed from the bottom, FIG. 13C is a cross-sectional view taken along D-D in FIG. 13A, which shows how the vibrator is held, and FIG. 13D is a cross-sectional view of a variation showing how the vibrator is held.

The vibration plate 101 is formed with hole-shaped engagement portions (recess-shaped portions) 101e, each having a central axis in the Z direction, at respective locations corresponding to the two node intersections 205 or in the vicinity thereof. The engagement portions 101e are formed integrally with the vibration plate 101 by press-forming e.g. by blanking the vibration plate 101. Engagement receiving portions 123 for receiving the engagement portions 101e, respectively, are fixed to the thin plate spring 405 e.g. by welding or bonding at respective locations adjusted by gauging to the same locations of the engagement portions 101e in the −Z direction. The engagement receiving portions 123 are each formed with a semi-spherical portion 123a at its tip end, for receiving an associated one of the engagement portions 101e in the −Z direction, and the locations of the engagement receiving portions 123 and the engagement portions 101e are adjusted such that the engagement receiving portions 123 are made coaxial with the engagement portions 101e.

Note that in the present embodiment, a combination of each engagement portion 101e and each engagement receiving portions 123 associated therewith is referred to as the vibrator engagement part. Further, the engagement receiving portions 123 and the thin plate spring 405 are referred to as the vibrator holding member 131, and the engagement portions 101e and the vibrator holding member 131 are collectively referred to as the vibrator holding section.

The dimension of each related component in the pressurizing direction is defined such that the thin plate spring 405 for holding the vibrator 100 is bent in the −Z direction (opposite to the Z direction) by the pressurizing force 413a of the pressurizing unit 416 (bending of the thin plate spring 405 in the −Z direction is omitted from illustration in FIGS. 13A to 13D). Therefore, the reaction force 405a of the thin plate spring 405 is generated in the Z direction, and the semi-spherical shape portions 123a as the tip ends of the engagement receiving portions 123 are always brought into pressure contact with the engagement portions 101e to thereby prevent looseness of the vibrator engagement parts in the X, Y, and Z directions.

Thus, the looseness of the vibrator engagement parts in the driving direction (X direction) during driving of the vibrator 100 is prevented. Further, as the plate spring characteristics of the thin plate spring 405, the thin plate spring 405 has no rigidity (i.e. is easily bent) in a direction orthogonal to the flat surface thereof (Z direction), but has rigidity in a direction orthogonal to the Z direction (X direction) (i.e. prevents generation of looseness). This prevents looseness of the vibrator holding section in the driving direction during driving of the vibrator 100. Further, the bending of the thin plate spring 405 in the pressurizing direction makes it easy to equalize the posture of the vibrator 100 with respect to the sliding member 104.

Furthermore, the vibrator holding section, except the portion used in fixing the thin plate spring 405 to the guide member 107, is accommodated in the dead space around the protrusions 101a, where there is no interference with the other components. This makes it possible to reduce the outer dimensions W and H of the ultrasonic motor 151, and thereby reduce the size of the ultrasonic motor 151, similarly to the third embodiment.

As described above, the vibrator holding sections are arranged at the two node intersections 205 as the intersections of the nodes 202 of the first bending vibration and the node 204 of the second bending vibration of the vibrator 100. By holding the vibrator 100 by engagement at the positions having the minimum vibration amplitude of the vibrator 100 as above, it is possible to hold the vibrator 100 in a manner avoiding suppression of vibration of the vibrator 100 as much as possible.

FIG. 13D shows the vibrator engagement parts in the same cross-sectional position as shown in FIG. 13C which are at the same locations and in the same direction as in FIG. 13C.

In FIG. 13D, in the vibrator 100, engagement portions 101f each having a tapered hole-shape are formed at respective locations corresponding to the two node intersections 205 or in the vicinity thereof. The engagement portions 101f are formed integrally with the vibration plate 101 e.g. by press-forming.

The thin plate spring 405 is formed with engagement receiving portions 124 each having a tapered portion 124a in its center. Then, the engagement portions 101f and the tapered portions 124a are engaged with each other to thereby prevent looseness of the vibrator engagement parts in the X, Y, and Z directions.

As described above, the engagement portions integrally formed with the vibration plate 101 can be formed to have various shapes and function as part of the vibrator holding section.

As described above, also in the fourth embodiment, it is possible to hold the vibrator in a manner avoiding suppression of vibration of the vibrator 100 as much as possible, and further reduce the size of the ultrasonic motor.

Next, a description will be given of an ultrasonic motor according to a fifth embodiment of the present invention. The same components of the fifth embodiment as those of the third embodiment are denoted by the same reference numerals.

The ultrasonic motor according to the fifth embodiment differs from the ultrasonic motor according to the third embodiment in the vibrator holding section, and the other components are configured similar to those of the ultrasonic motor according to the third embodiment.

Figure 14A:
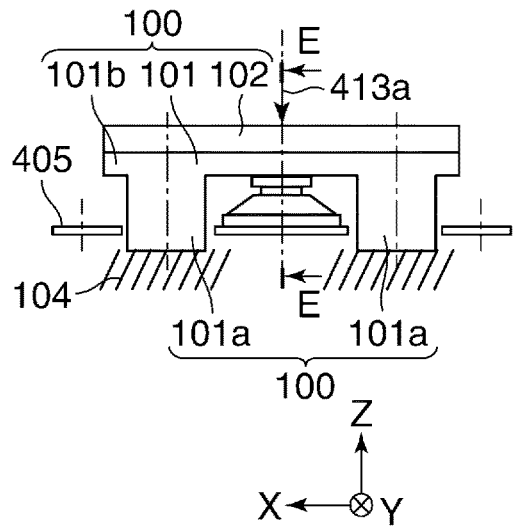
FIGS. 14A to 14D are diagrams useful in explaining how a vibrator is held in an ultrasonic motor as a motor according to a fifth embodiment of the present invention.
Figure 14C:
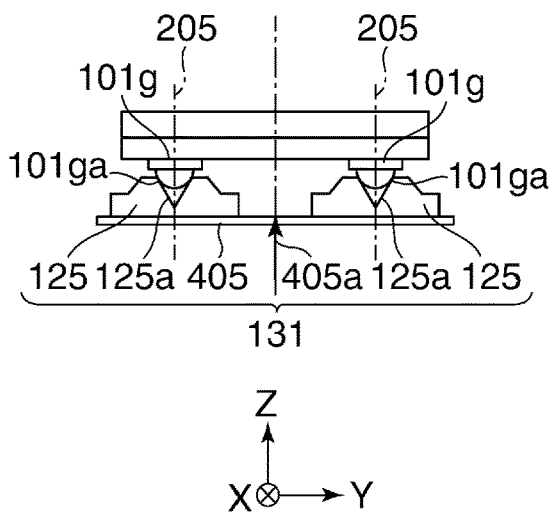
Figure 14B:
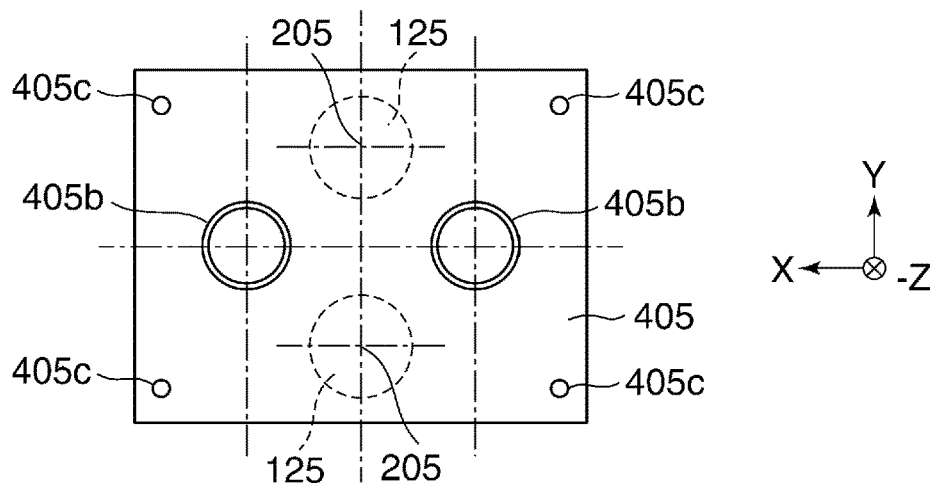
Figure 14D:
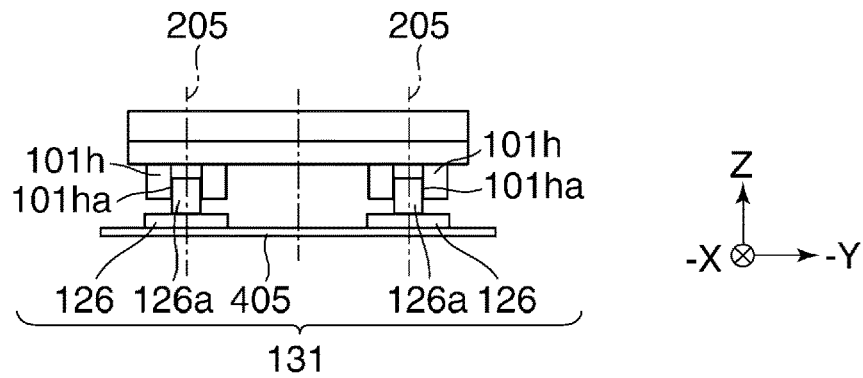

FIGS. 14A to 14D are diagrams useful in explaining how the vibrator is held in the ultrasonic motor according to the fifth embodiment, in which FIG. 14A shows how the vibrator is held, in cut-away, as viewed from the side. FIG. 14B shows the vibrator, as viewed from the bottom. FIG. 14C is a cross-sectional view, taken along E-E in FIG. 14A, showing how the vibrator is held, and FIG. 14D is a cross-sectional view of a variation showing how the vibrator is held.

The vibration plate 101 has engagement portions 101g formed thereon, as separate bodies, which extend from the surface formed with the protrusions 101a, in the −Z direction, and are fixed to the surface by bonding at respective locations corresponding to the two node intersections 205 or in the vicinity thereof. The engagement portions 101g each have a tip end formed as a convex-shaped portion 101ga having a semi-spherical shape.

Engagement receiving portions 125 for receiving the engagement portions 101g, respectively, are fixed on the thin plate spring 405 e.g. by welding or bonding at respective locations adjusted by gauging to the same locations of the engagement portions 101g in the −Z direction. The engagement receiving portions 125 are each has a tip end formed as a cone-shaped recess 125a for receiving an associated one of the engagement portions 101g in the −Z direction, and the locations of the engagement receiving portions 125 and the engagement portions 101g are adjusted by gauging such that the engagement receiving portions 125 and the engagement portions 101g are coaxial with each other.

Note that a combination of each engagement portion 101g and each engagement receiving portion 125 associated therewith is referred to as the vibrator engagement part. Further, the engagement receiving portions 125 and the thin plate spring 405 are referred to as the vibrator holding member 131, and the engagement portions 101g and the vibrator holding member 131 are collectively referred to as the vibrator holding section.

The dimension of each related component in the pressurizing direction is defined such that the thin plate spring 405 for holding the vibrator 100 is bent in the −Z direction (opposite to the Z direction) by the pressurizing force 413a of the pressurizing unit 416 (bending of the thin plate spring 405 in the −Z direction is omitted from illustration in FIGS. 14A to 14D). Therefore, the reaction force 405a of the thin plate spring 405 is generated in the Z direction, and the cone-shaped recesses 125a located in the respective centers of the engagement receiving portions 125 are always brought into pressure contact with the engagement portions 101g to thereby prevent looseness of the vibrator engagement parts in the X, Y, and Z directions.

FIG. 14D shows the vibrator engagement parts in the same cross-sectional position as shown in FIG. 14C which are at the same locations and in the same direction as in FIG. 14C.

In FIG. 14D, the vibrator 100 has engagement portions 101h, each having a hole-shaped portion 101ha in its center, formed and fixed thereto as separate bodies at respective locations corresponding to the two node intersections 205 or in the vicinity thereof. The thin plate spring 405 is formed with engagement receiving portions 126 each having a shaft portion 126a in its center. Then, the hole-shaped portions 101ha and the shaft portions 126a are fitted to each other to thereby prevent looseness of the vibrator engagement portions in the X, Y, and Z directions.

As described above, in the fifth embodiment as well, it is possible to hold the vibrator 100 in a manner avoiding suppression of vibration of the vibrator 100 as much as possible, and what is more, reduce the size of the ultrasonic motor.

Next, a description will be given of an ultrasonic motor according to a sixth embodiment of the present invention. The same component elements of the sixth embodiment as those of the third embodiment are denoted by the same reference numerals.

The ultrasonic motor according to the sixth embodiment differs from the ultrasonic motor according to the third embodiment in the vibrator holding section, and the other components are configured similar to those of the ultrasonic motor according to the third embodiment.

Figures 15A, 15B, 15C:
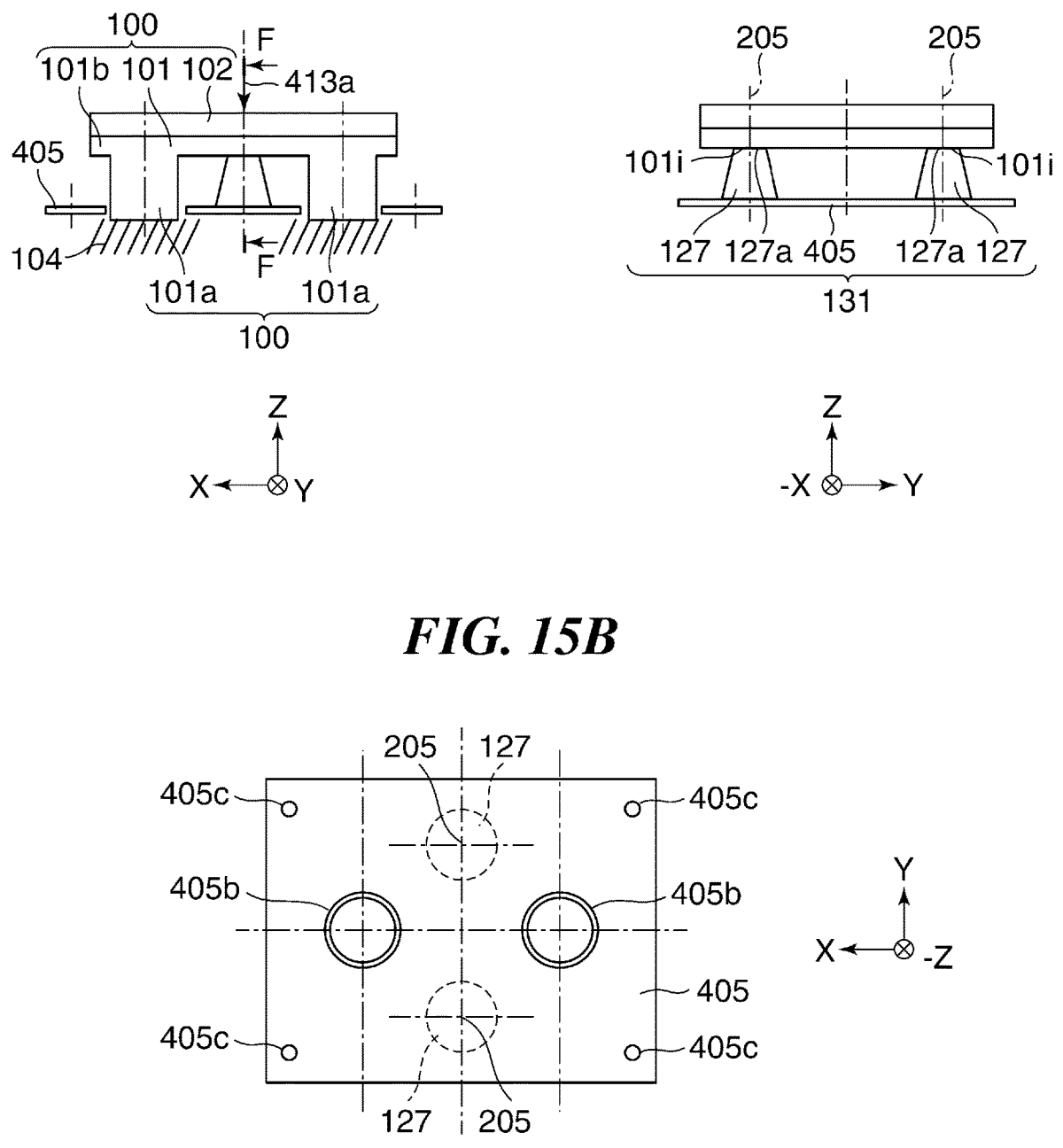

FIGS. 15A to 15C are diagrams useful in explaining how the vibrator is held in the ultrasonic motor according to the sixth embodiment. FIG. 15A shows how the vibrator is held, in cut-away, as viewed from the side. FIG. 15B shows the vibrator, as viewed from the bottom, and FIG. 15C is a cross-sectional view taken along F-F in FIG. 15A, which shows how the vibrator is held.

As shown in FIGS. 15A to 15C, the surface of the vibration plate 101, on which the protrusions 101a are formed, has a planar shape in an X-Y plane. Portions on the planar shape, corresponding to the two node intersections 205, are referred to as engagement portions 101i.

Engagement receiving portions 127 that are engaged with the engagement portions 101i are fixed to the thin plate spring 405 e.g. by welding or bonding at the same locations as the engagement portions 101i in the −Z direction (opposite to the Z direction). A planar shape portion 127a extending in an X-Y plane is defined on a tip end of each engagement receiving portion 127, and the tip end is engaged with an associated one of the engagement portions 101i by a fixing method, such as welding or bonding.

Note that a combination of each engagement portion 101i and each engagement receiving portion 127 associated therewith is referred to as the vibrator engagement part. Further, the engagement receiving portions 127 and the thin plate spring 405 are referred to as the vibrator holding member 131, and the engagement portions 101i and the vibrator holding member 131 are collectively referred to as the vibrator holding section.

In the sixth embodiment, the vibrator engagement parts prevent looseness in the X and Y directions by bonding the engagement portions 101i (i.e. the planar shape portions extending in the X-Y plane) and the planar shape portions 127a formed at the tip ends of the engagement receiving portions 127, respectively. This prevents looseness of the vibrator engagement portions in the driving direction (X direction) during driving of the vibrator 100.

In the above-described example, part of the surface of the vibration plate 101 on which the protrusions 101a are formed, is used as the engagement portions 101i. However, the engagement portions 101i may be defined not on the surface on which the protrusions 101a are formed, but on a peripheral portion shifted from the surface on which the protrusions 101a are formed, in the Z direction. Further, each engagement portion 101i is not necessarily required to have a planar shape in the X-Y plane, but may be slightly inclined.

As described above, also in the sixth embodiment of the present invention, it is possible to hold the vibrator 100 in a manner avoiding suppression of vibration of the vibrator 100 as much as possible, and what is more, reduce the size of the ultrasonic motor.

While the present invention has been described with reference to exemplary embodiments, it is to be understood that the invention is not limited to the disclosed exemplary embodiments. For example, the electronic apparatus to which the ultrasonic motor according to the above-described first to sixth embodiments can be applied is not limited to the lens apparatus, but the ultrasonic motor can be applied to an image pickup apparatus so as to move an image pickup device or a shutter.

This application claims the benefit of Japanese Patent Application No. 2016-200722 filed Oct. 12, 2016, which is hereby incorporated by reference herein in its entirety.

What is claimed is:

1. A motor that includes a vibrator and a holding unit that holds the vibrator, and moves the vibrator and a friction member in frictional contact with the vibrator relative to each other, by vibrating the vibrator, comprising:
   a pressurizing unit configured to pressurize the vibrator against the friction member; and
   a holding force generation unit configured to generate a holding force for causing the holding unit to hold the vibrator,
   wherein the holding unit is not disposed between the pressurizing unit and the vibrator, and
   wherein a holding direction in which the holding force is generated by the holding force generation unit and a pressurizing direction in which a pressurizing force is generated by the pressurizing unit are substantially parallel to each other.

2. The motor according to claim 1, wherein the holding unit includes a first holding member for holding the vibrator and a second holding member for holding the first holding member, and
   wherein the second holding member is provided with the pressurizing unit and the holding force generation unit, and the holding force generation unit generates the holding force for the first holding member.

3. The motor according to claim 2, wherein the vibrator includes a piezoelectric element that vibrates the vibrator, and
   wherein the first holding member is brought into contact with the vibrator, at a location between the piezoelectric element and the friction member in the pressurizing direction.

4. The motor according to claim 1, wherein the pressurizing force is larger than the holding force.

5. The motor according to claim 1, wherein the holding direction and the pressurizing direction are the same direction.

6. An electronic apparatus including:
   a motor that includes a vibrator and a holding unit that holds the vibrator, and moves the vibrator and a friction member in frictional contact with the vibrator relative to each other, by vibrating the vibrator, and
   a drive member that is driven by driving the motor,
   wherein the motor comprises:
   a pressurizing unit configured to pressurize the vibrator against the friction member; and
   a holding force generation unit configured to generate a holding force for causing the holding unit to hold the vibrator,
   wherein the holding unit is not disposed between the pressurizing unit and the vibrator, and
   wherein a holding direction in which the holding force is generated by the holding force generation unit and a pressurizing direction in which a pressurizing force is generated by the pressurizing unit are substantially parallel to each other.

7. The electronic apparatus according to claim 6, wherein the drive member is provided with an optical lens.

* * * * *